US011961457B2

(12) United States Patent
Koh et al.

(10) Patent No.: US 11,961,457 B2
(45) Date of Patent: Apr. 16, 2024

(54) DISPLAY DEVICE

(71) Applicant: Samsung Display Co., LTD., Yongin-si (KR)

(72) Inventors: Jae Hyun Koh, Yongin-si (KR); Sung Hoon Bang, Yongin-si (KR); Eui Myeong Cho, Yongin-si (KR); Ho Cheol Kang, Yongin-si (KR); Seok Young Yoon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/094,968

(22) Filed: Jan. 9, 2023

(65) Prior Publication Data

US 2023/0230534 A1 Jul. 20, 2023

(30) Foreign Application Priority Data

Jan. 14, 2022 (KR) ........................ 10-2022-0006154

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0819* (2013.01); *G09G 2300/0842* (2013.01); *G09G 2310/08* (2013.01); *G09G 2320/0247* (2013.01); *G09G 2320/0257* (2013.01)

(58) Field of Classification Search
CPC ... G09G 3/32–3291; G09G 2320/0247; G09G 3/2007–2081; G09G 2300/0819; G09G 2320/0257
See application file for complete search history.

(56) References Cited

U.S. PATENT DOCUMENTS

| | | | | |
|---|---|---|---|---|
| 9,823,729 | B2 | 11/2017 | An et al. | |
| 10,847,092 | B2 * | 11/2020 | Bae | G09G 3/3258 |
| 10,879,480 | B2 | 12/2020 | Shim et al. | |
| 11,081,054 | B2 * | 8/2021 | Kim | G09G 3/3291 |
| 11,151,949 | B2 * | 10/2021 | Hwang | G09G 3/3291 |
| 11,183,113 | B2 * | 11/2021 | Lhee | G09G 3/3696 |
| 11,282,441 | B2 * | 3/2022 | Kim | G09G 3/2081 |

(Continued)

FOREIGN PATENT DOCUMENTS

| | | | |
|---|---|---|---|
| KR | 10-0219178 | B1 | 9/1999 |
| KR | 10-1560403 | B1 | 10/2015 |

(Continued)

*Primary Examiner* — Patrick F Marinelli
(74) *Attorney, Agent, or Firm* — Lewis Roca Rothgerber Christie LLP

(57) ABSTRACT

A display device, includes: a display panel including a pixel electrically coupled to a gate line and a data line; a gate driver configured to provide a gate signal to the gate line; and a data driver configured to provide a data signal to the data line, wherein the gate driver is configured to sequentially provide a first gate signal and a second gate signal to the gate line during a first frame period, wherein the data driver is configured to provide a first data signal to the data line in response to the first gate signal, and to provide a second data signal to the data line in response to the second gate signal, and wherein the second data signal is different from the first data signal and varies dependent on the first data signal.

14 Claims, 13 Drawing Sheets

(56) References Cited

U.S. PATENT DOCUMENTS 11,670,225 B2 * 6/2023 Kim ..................... G09G 3/2092
345/204
11,741,878 B2 * 8/2023 Kim ..................... G09G 3/3233
345/212
11,747,954 B1 * 9/2023 Aranda ............... G06F 3/04815
715/848
11,749,208 B2 * 9/2023 Kim ..................... G09G 3/3275
345/204
2016/0171930 A1 * 6/2016 Song .................... G09G 3/3225
345/77
2017/0039955 A1 * 2/2017 Park ..................... G09G 3/3233
2018/0074569 A1 * 3/2018 An ........................ G06F 1/3265
2018/0293944 A1 * 10/2018 Kim ..................... G09G 3/3233
2019/0164494 A1 * 5/2019 Bae ...................... G09G 3/3258
2019/0287458 A1 * 9/2019 Park ..................... G09G 3/3233
2020/0152128 A1 * 5/2020 Kim ..................... G09G 3/3266
2020/0312240 A1 * 10/2020 Lhee .................... G09G 3/3225
2021/0090507 A1 * 3/2021 Hwang ................ G09G 3/3291
2021/0272495 A1 * 9/2021 Park ......................... H04N 5/14
2021/0272505 A1 * 9/2021 Kim ..................... G09G 3/2081
2021/0383759 A1 * 12/2021 Park ..................... G09G 3/3258
2022/0122550 A1 * 4/2022 Ha ....................... G09G 3/3291
2022/0208085 A1 * 6/2022 Kim .......................... G09G 3/36
2022/0262295 A1 * 8/2022 Kim ..................... G09G 3/3233
2023/0057284 A1 * 2/2023 Jang ......................... G09G 3/32
2023/0084458 A1 * 3/2023 Lee ........................ G09G 5/005
345/204
2023/0162667 A1 * 5/2023 Park ..................... G09G 3/3208
365/189.05
2023/0230534 A1 * 7/2023 Koh ......................... G09G 3/32
345/55
2023/0282154 A1 * 9/2023 Sohn ........................ G09G 3/20
345/55

FOREIGN PATENT DOCUMENTS

KR 10-2020-0081966 A 7/2020
KR 10-2288351 B1 8/2021

* cited by examiner

DISPLAY DEVICE

CROSS-REFERENCE TO RELATED APPLICATION

The present application claims priority to and the benefit of Korean patent application number 10-2022-0006154 filed on Jan. 14, 2022, the entire disclosure of which is incorporated herein in its entirety by reference.

BACKGROUND

1. Field

Aspects of some embodiments of the present disclosure relate to a display device.

2. Related Art

Each pixel in a display device may emit light with a luminance corresponding to a data signal input through a data line. A display device may display a frame image through a combination of pixels that emit light based on data signals.

When the display device displays a motion picture (e.g., a moving picture or video), a blurred afterimage may be visually perceived by users because a previous image and a current image overlap each other. In order to overcome a phenomenon in which an afterimage is visually perceived (e.g., a motion blur phenomenon), technology for displaying a black image between frames of video (or black frame insertion technology) may be utilized.

However, when a black image is inserted between frames, the occurrence of an afterimage may be overcome, but the luminance, or perceived luminance, of the images (e.g., video) may be deteriorated, and a flicker may occur or may be visually perceived.

The above information disclosed in this Background section is only for enhancement of understanding of the background and therefore the information discussed in this Background section does not necessarily constitute prior art.

SUMMARY

Aspects of some embodiments of the present disclosure include a display device, which can alleviate the deterioration of an image luminance while overcoming or reducing the occurrence (or perception) of an afterimage.

Characteristics of embodiments according to the present disclosure are not limited to the above-described characteristics, and other characteristics, not described here, may be more clearly understood by those skilled in the art from the following description.

According to some embodiments of the present disclosure, a display device includes a display panel including a pixel electrically coupled to a gate line and a data line. According to some embodiments, a gate driver configured to provide a gate signal to the gate line; and a data driver configured to provide a data signal to the data line. According to some embodiments, the gate driver sequentially provides a first gate signal and a second gate signal to the gate line during a first frame period. According to some embodiments, the data driver provides a first data signal to the data line in response to the first gate signal, and provides a second data signal to the data line in response to the second gate signal. According to some embodiments, the second data signal is different from the first data signal and varies dependent on the first data signal.

According to some embodiments, the second data signal may be different from a black data signal corresponding to a black image.

According to some embodiments, the first frame period may include a first sub-frame period and a second sub-frame period, and the pixel may emit light with a luminance corresponding to the first data signal during the first sub-frame period, and emits light with a luminance corresponding to the second data signal during the second sub-frame period.

According to some embodiments, a second grayscale value corresponding to the second data signal may be proportional to a first grayscale value corresponding to the first data signal.

According to some embodiments, the display device may further include a timing controller configured to generate frame data based on input image data provided from an external device and generate attenuated data by downscaling grayscale values included in the frame data, wherein the data driver may generate the first data signal based on the frame data and generate the second data signal based on the attenuated data.

According to some embodiments, the timing controller may calculate the second grayscale value included in the attenuated data by multiplying a scaling factor by the first grayscale value included in the frame data.

According to some embodiments, the scaling factor may vary in accordance with a load of at least a portion of the frame data.

According to some embodiments, a width of the second sub-frame period may vary in accordance with a load of the frame data.

According to some embodiments, the second data signal may be proportional to the first data signal.

According to some embodiments, a width of the second sub-frame period may vary in each frame period.

Aspects of some embodiments of the present disclosure include a display panel including a pixel, wherein the pixel includes a light-emitting element and a driving transistor configured to provide a driving current to the light-emitting element in response to a voltage between a gate electrode and a source electrode of the driving transistor, the gate electrode of the driving transistor is electrically coupled to a data line, and the source electrode of the driving transistor is electrically coupled to a readout line; and a data driver configured to provide a data signal to the data line and provide a reference voltage to the readout line. According to some embodiments, one frame period may include a first sub-frame period and a second sub-frame period. According to some embodiments, the data driver may provide a first reference voltage to the readout line during the first sub-frame period and provide a second reference voltage to the readout line during the second sub-frame period. According to some embodiments, the second reference voltage may be different from the first reference voltage and varies dependent on the data signal.

According to some embodiments, the data driver may provide an identical data signal to the pixel during each of the first sub-frame period and the second sub-frame period.

According to some embodiments, the second reference voltage may remain constant during the second sub-frame period.

According to some embodiments, the second reference voltage may vary by stages at least twice during the second sub-frame period.

According to some embodiments of the present disclosure may include a display device including a display panel including a first pixel electrically coupled to a first gate line and a data line and a second pixel electrically coupled to a second gate line and the data line; a gate driver configured to provide a gate signal to the first and second gate lines; and a data driver configured to provide a data signal to the data line. According to some embodiments, a frame image is displayed during each of a first frame period and a second frame period, and each of the first and second frame periods includes a first sub-frame period and a second sub-frame period. According to some embodiments, the gate driver may be configured to provide the gate signal to each of the first gate line and the second gate line during the first sub-frame period in each of the first and second frame periods, and alternately provide the gate signal to the first gate line and the second gate line during the second sub-frame periods of the first and second frame periods.

According to some embodiments, the data driver may provide a black data signal, corresponding to a black image, to the data line during each second sub-frame period.

According to some embodiments, the data driver may provide a first data signal to the data line during each first sub-frame period and provide a second data signal to the data line during each second sub-frame period, and the second data signal may be different from the first data signal, and may vary dependent on the first data signal.

According to some embodiments, the first pixel may emit light with a luminance corresponding to the first data signal during the first sub-frame period of the first frame period and emit light with a luminance corresponding to the second data signal during the second sub-frame period of the first frame period.

According to some embodiments, a second grayscale value corresponding to the second data signal may be proportional to a first grayscale value corresponding to the first data signal.

According to some embodiments, the display device may further include a timing controller configured to generate frame data based on input image data provided from an external device and generate attenuated data by downscaling grayscale values included in the frame data, wherein the data driver may generate the first data signal based on the frame data and generate the second data signal based on the attenuated data.

Other detailed matters of the embodiments are included in the detailed description and the drawings.

DETAILED DESCRIPTION

Figure 1:
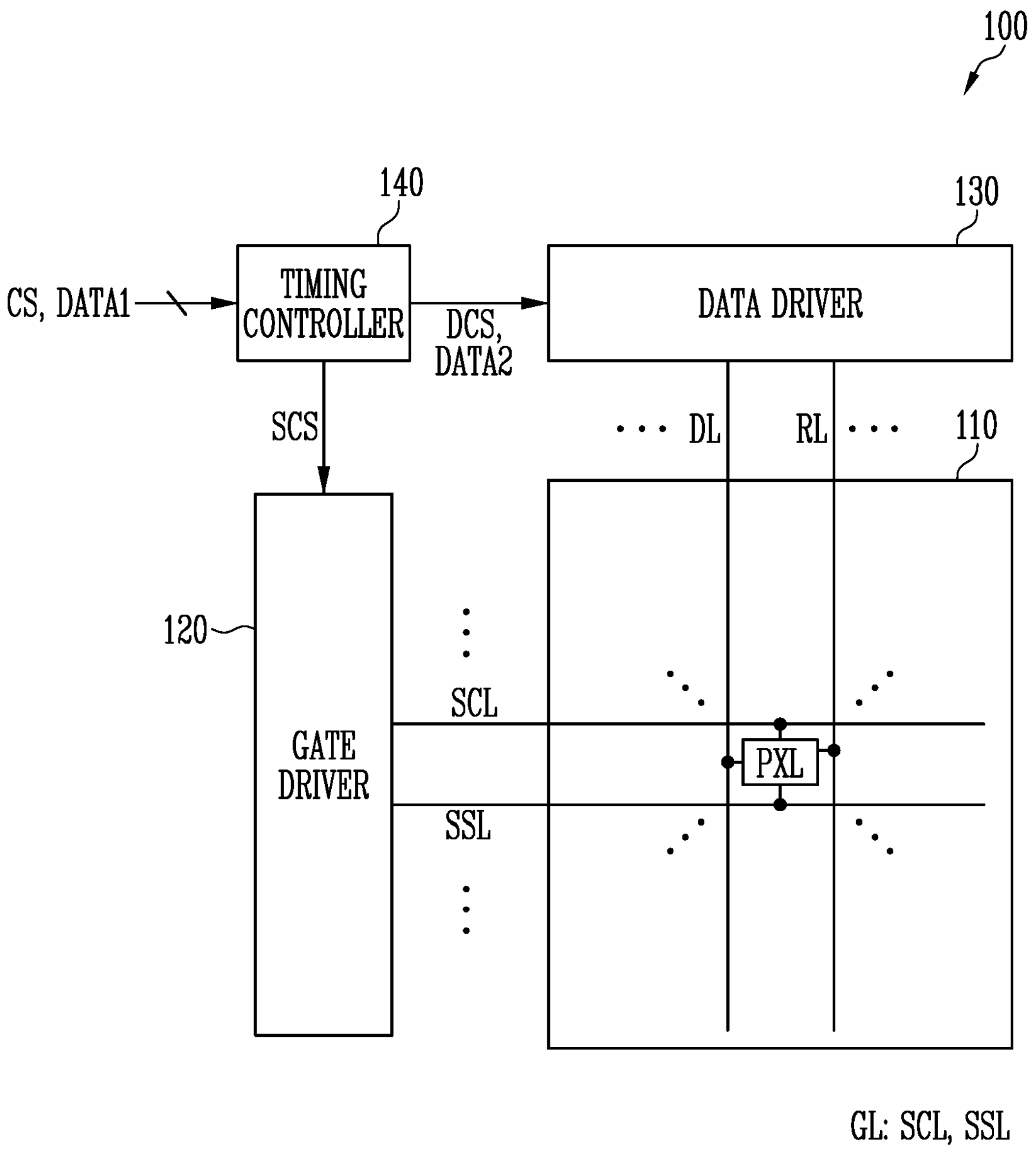
FIG. 1 is a block diagram illustrating a display device according to some embodiments of the present disclosure.

Reference will now be made in more detail to various embodiments of the present disclosure, specific examples of which are illustrated in the accompanying drawings and described below, because the embodiments of the present disclosure can be variously modified in many different forms. Furthermore, a singular form may include a plural from as long as it is not specifically mentioned in a sentence.

Some embodiments are described and illustrated in the accompanying drawings in terms of functional blocks, units, and/or modules. Those skilled in the art will appreciate that these blocks, units and/or modules are physically implemented by logic circuits, discrete components, microprocessors, hard-wired circuits, memory elements, wiring connections, and additional electronic circuits, which may be formed using semiconductor-based fabrication techniques or other manufacturing technologies. In the case of the blocks, units and/or modules being implemented by microprocessors or similar hardware, they may be programmed and controlled using software to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module in some embodiments may be physically separated into two or more interacting and discrete blocks, units and/or modules without departing from the scope of the concept of the present disclosure. Further, the blocks, units and/or modules in some embodiments may be physically combined into more complex blocks, units and/or modules without departing from the scope of the concept of the present disclosure.

Meanwhile, aspects of some embodiments of the present disclosure may be modified and practiced in various forms rather than being limited by embodiments disclosed herein. Further, each embodiment disclosed herein may be practiced alone, or may be combined with at least one additional embodiment and then be practiced in combination.

Some elements which are not directly related to the features of the present disclosure in the drawings may be omitted so as to clearly explain the present disclosure. Further, the sizes, ratios, etc. of some elements in the drawings may be slightly exaggerated. It should be noted that the same reference numerals are used to designate the same or similar elements throughout the drawings, and thus some repeated descriptions thereof may be omitted.

FIG. 1 is a block diagram illustrating a display device according to some embodiments of the present disclosure.

A display device 100 may include a display component 110 (or a display panel), a gate driver 120 (or a scan driver), a data driver 130 (or a source driver), and a timing controller 140.

The display component 110 may display images. The display component 110 may include a gate line GL, a data line DL, a readout line RL (or a sensing line), and a pixel PXL. The gate line GL may include a scan line SCL and a sensing scan line SSL. Each of the scan line SCL, the sensing scan line SSL, the data line DL, the readout line RL, and the pixel PXL may be provided to be plural in number.

The pixel PXL may be arranged or located in an area (e.g., a pixel area) divided the scan line SCL (or the sensing scan line SSL) and the data line DL.

The pixel PXL may be coupled (or electrically coupled) to the scan line SCL, the sensing scan line SSL, the data line DL, and the readout line RL.

The pixel PXL may be initialized using a reference voltage (or an initialization voltage) provided through the readout line RL in response to a sensing scan signal provided through the sensing scan line SSL. The pixel PXL may also store or write a data signal (or a data voltage) provided through the data line DL in response to a scan signal provided through the scan line SCL, and may emit light with a luminance corresponding to the stored data signal. Here, the voltage level of the reference voltage may be set to be lower than the operating point (or threshold voltage) of a light-emitting element in the pixel PXL, but the reference voltage is not limited thereto. Further details of an example configuration of the pixel PXL will be described later with reference to FIG. 2.

The gate driver 120 may generate the scan signal in response to a scan control signal SCS (or a gate control signal), and may provide the scan signal to the scan line SCL. Here, the scan control signal SCS may include a start signal, clock signals, etc., and may be provided from the timing controller 140 to the gate driver 120. For example, the gate driver 120 may be implemented as a shift register, which generates and outputs the scan signal by sequentially shifting a pulse-shaped start signal using the clock signals. Further, the gate driver 120 may generate the sensing scan signal in a manner similar to the generation of the scan signal, and may provide the sensing scan signal to the sensing scan line SSL.

The gate driver 120 may also be formed together with the pixel PXL on the display component 110. However, the gate driver 120 is not limited thereto, and may be implemented as, for example, an integrated circuit (IC) and mounted on a circuit film, and may be coupled to the timing controller 140 via at least one circuit film and a printed circuit board.

The data driver 130 may generate a data signal (or a data voltage) based on image data DATA2 and a data control signal DCS, which are provided from the timing controller 140, and may provide the data signal to the display component 110 (or the pixel PXL) through the data line DL. Here, the data control signal DCS may be a signal for controlling the operation of the data driver 130, and may include a load signal (or a data enable signal) for instructing the output of a valid data signal, a horizontal start signal, a data clock signal, etc.

For example, the data driver 130 may include a shift register which generates a sampling signal by shifting the horizontal start signal in synchronization with the data clock signal, a latch which latches the image data DATA2 in response to the sampling signal, a digital-to-analog converter (ADC) (or a decoder) which converts the latched image data (e.g., digital-format data) into an analog-format data signal, and a buffer (or an amplifier) which outputs the data signal to the data line DL. Also, the data driver 130 may provide the reference voltage to the display component 110 (or the pixel PXL) through the readout line RL.

Further, the data driver 130 may provide a test signal (or a test voltage) to the pixel PXL through the data line DL and receive the sensing signal from the pixel PXL through the readout line RL in a separate sensing mode or during a sensing period (e.g., during a sensing period allocated so as to sense electrical characteristics of the pixel, such as the threshold voltage and/or mobility of a driving transistor included in the pixel PXL). The sensing signal may be used to compensate for the electrical characteristics (or characteristic variation) of the pixel PXL by at least one of the data driver 130 or the timing controller 140.

The timing controller 140 may receive input image data DATA1 and a control signal CS from an external device (e.g., a graphic processor), may generate the scan control signal SCS and the data control signal DCS in response to the control signal CS, and may generate the image data DATA2 by converting the input image data DATA1. The control signal CS may include a vertical synchronization signal, a horizontal synchronization signal, a reference clock signal, etc. The vertical synchronization signal may indicate the start of frame data (i.e., data corresponding to a frame period in which a single frame image is displayed), and the horizontal synchronization signal may indicate the start of a data row (i.e., one of a plurality of data rows included in the frame data). For example, the timing controller 140 may convert the input image data DATA1 into image data DATA2 having a format conforming to a pixel array in the display component 110.

According to some embodiments, the timing controller 140 may generate frame data and attenuated data (or attenuated frame data) based on the input image data DATA1. The frame data (or active frame data) may be normal image data corresponding to a single frame image. The attenuated data may be data generated by attenuating (or downscaling) the frame data, and may vary dependent on the frame data. For example, the timing controller 140 may generate the attenuated data by reducing the frame data at a specific rate (e.g., "attenuated data=frame data×β", where $0<\beta<1$). The frame data and the attenuated data may be included in the image data DATA2, but the attenuated data may be located or inserted between frame data and adjacent frame data (i.e., between pieces of frame data). In this case, the display component 110 may display frame images corresponding to pieces of frame data so that an attenuated frame image corresponding to the attenuated data is displayed between the frame images. The attenuated frame image may alleviate the deterioration of luminance of all images (e.g., video) while preventing the occurrence of afterimages of frame images. The attenuated data will be described in detail later with reference to FIG. 4.

According to some embodiments, the display device 100 may further include a power supply. The power supply may supply a first supply voltage and a second supply voltage to the display component 110. The first and second supply voltages may be power supply voltages or driving voltages required for the operation of the pixel PXL. Also, the power supply may provide the reference voltage to the data driver 130. In addition, the power supply may provide driving voltages to at least one of the gate driver 120, the data driver 130, or the timing controller 140. The power supply may be implemented as a power management integrated circuit (PMIC).

Meanwhile, each of the data driver 130 and the timing controller 140 may be implemented as, but is not limited to, a separate integrated circuit. For example, the data driver 130 and the timing controller 140 may be implemented as a single integrated circuit. According to some embodiments, at least two of the gate driver 120, the data driver 130, and the timing controller 140 may be implemented as a single integrated circuit.

Figure 2:
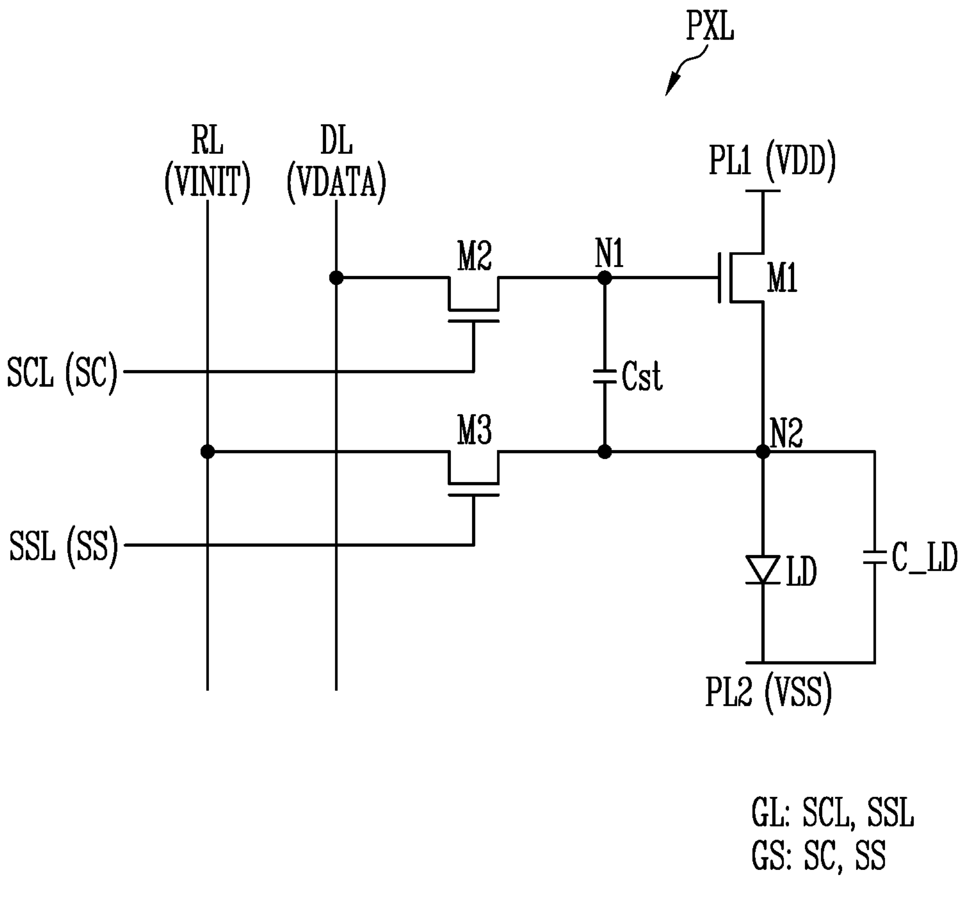
FIG. 2 is a circuit diagram illustrating an example of a pixel included in the display device of FIG. 1 according to some embodiments of the present disclosure.

FIG. 2 is a circuit diagram illustrating an example of a pixel circuit structure of a pixel PXL included in the display device of FIG. 1.

Referring to FIGS. 1 and 2, the pixel PXL may be coupled between a first power line PL1 and a second power line PL2. A first supply voltage VDD may be applied to the first power line PL1, and a second supply voltage VSS may be applied to the second power line PL2. The first and second supply voltages VDD and VSS may be power supply voltages or driving voltages required for the operation of the pixel PXL, wherein the first supply voltage VDD may have a voltage level higher than that of the second supply voltage VSS. For example, the voltage level of the first supply voltage VDD may be about 20 V to 30 V, and the voltage level of the second supply voltage VSS may be about 0 V.

The pixel PXL may be coupled to a scan line SCL, a sensing scan line SSL, a data line DL, and a readout line RL.

The pixel PXL may include a first transistor M1 (or a driving transistor), a second transistor M2 (or a first switching transistor), a third transistor M3 (or a sensing transistor, a second switching transistor, or an initialization transistor), a storage capacitor Cst, and a light-emitting element LD. Each of the first to third transistors M1 to M3 may be, but is not limited to, a thin film transistor including an oxide semiconductor. For example, at least some of the first to third transistors M1 to M3 may include a polysilicon semiconductor, or may be implemented using an N-type or a P-type semiconductor.

A first electrode of the first transistor M1 may be coupled to the first power line PL1, and a second electrode of the first transistor M1 may be coupled to a second node N2. The first electrode of the first transistor M1 may be a drain electrode, and the second electrode of the first transistor M1 may be a source electrode. A gate electrode of the first transistor M1 may be coupled to a first node N1. The first transistor M1 may control the amount of current flowing through the light-emitting element LD in accordance with the voltage of the first node N1 (or a gate-source voltage between the gate electrode and the second electrode of the first transistor M1).

A first electrode of the second transistor M2 may be coupled to the data line DL, and a second electrode of the second transistor M2 may be coupled to the first node N1. A gate electrode of the second transistor M2 may be coupled to the scan line SCL. When a scan signal SC having a turn-on voltage level is supplied to the scan line SCL, the second transistor M2 may be turned on, thus transferring a data signal VDATA (or a data voltage) from the data line DL to the first node N1.

The storage capacitor Cst may be formed or coupled between the first node N1 and the second node N2 (or a first electrode of the light-emitting element). The storage capacitor Cst may store the voltage of the first node N1, or alternatively, charges corresponding to the voltage of the first node N1 may be stored in the storage capacitor Cst.

A first electrode of the third transistor M3 may be coupled to the second node N2, and a second electrode of the third transistor M3 may be coupled to a readout line RL. A gate electrode of the third transistor M3 may be coupled to the sensing scan line SSL. When a sensing scan signal SS having a turn-on voltage level is supplied to the sensing scan line SSL, the third transistor M3 may be turned on, thus coupling the second node N2 to the readout line RL. In this case, a reference voltage VINIT (or an initialization voltage) applied to the readout line RL may be applied to the second node N2. The voltage of the second node N2 or the first electrode of the light-emitting element LD may be initialized using the reference voltage VINIT.

When the second transistor M2 and the third transistor M3 are simultaneously (or concurrently) turned on in response to the scan signal SC and the sensing scan signal SS, a voltage difference between the data signal VDATA and the reference voltage VINIT may be stored in the storage capacitor Cst. Thereafter, when the third transistor M3 is turned off, the first transistor M1 may control the amount of current flowing through the light-emitting element LD in accordance with the voltage difference stored in the storage capacitor Cst.

In contrast, when the second node N2 and the readout line RL remain coupled to each other due to the third transistor M3, the sensing signal (or the amount of current) corresponding to the voltage difference (i.e., the voltage difference between the data signal VDATA and the reference voltage VINIT) may be output from the pixel PXL through the readout line RL. For example, when the first transistor M1 is turned on in response to a test signal (i.e., a test signal or a test voltage applied as the data signal VDATA) during a sensing period, current flowing through the first transistor M1 may be output as the sensing signal through the readout line RL in accordance with the test signal.

The light-emitting element LD (or light-emitting unit) may be electrically connected between the second node N2 and the second power line PL2.

A first electrode of the light-emitting element LD may be coupled (or electrically connected) to the second node N2 (or the second electrode of the first transistor M1). The first electrode of the light-emitting element LD may be an anode electrode. The first electrode of the light-emitting element LD may be electrically connected to the first power line PL1 via the first transistor M1. The second electrode of the light-emitting element LD may be coupled to the second power line PL2. The second electrode of the light-emitting element LD may be a cathode electrode. The light-emitting element LD may generate light with a certain luminance in accordance with the amount of current (or driving current) supplied from the first transistor M1.

The light-emitting element LD may be formed of a subminiature light-emitting diode which is made of a material having an inorganic crystalline structure and has a small size ranging from a nanoscale to a microscale. The light-emitting element LD may be a subminiature light-emitting diode manufactured using an etching method, or a subminiature light-emitting diode manufactured using a growth method. However, the type of the light-emitting element LD is not limited thereto. For example, the light-emitting element LD may be implemented as an inorganic light-emitting diode such as a micro-light-emitting diode or a quantum dot light-emitting diode. In other examples, the light-emitting element LD may be implemented as an organic light-emitting diode, or a light-emitting diode in which an organic material and an inorganic material are combined with each other.

Although only a single light-emitting element LD is illustrated in FIG. 2, embodiments according to the present disclosure are not limited thereto. In an example, the pixel PXL may include a plurality of light-emitting elements coupled in series to each other between the first power line PL1 and the second power line PL2, wherein the plurality of light-emitting elements may form a single light-emitting unit (or a single light source). According to some embodiments, the pixel PXL may include a plurality of light-emitting elements coupled in parallel to each other between the first power line PL1 and the second power line PL2. According to some embodiments, the PXL may include a plurality of light-emitting elements coupled in a series/parallel hybrid structure.

According to some embodiments, the pixel PXL may further include a light-emitting capacitor C_LD coupled in parallel to the light-emitting element LD.

Meanwhile, according to some embodiments of the present disclosure, the pixel PXL is not limited to the circuit structure illustrated in FIG. 2.

Figure 3:
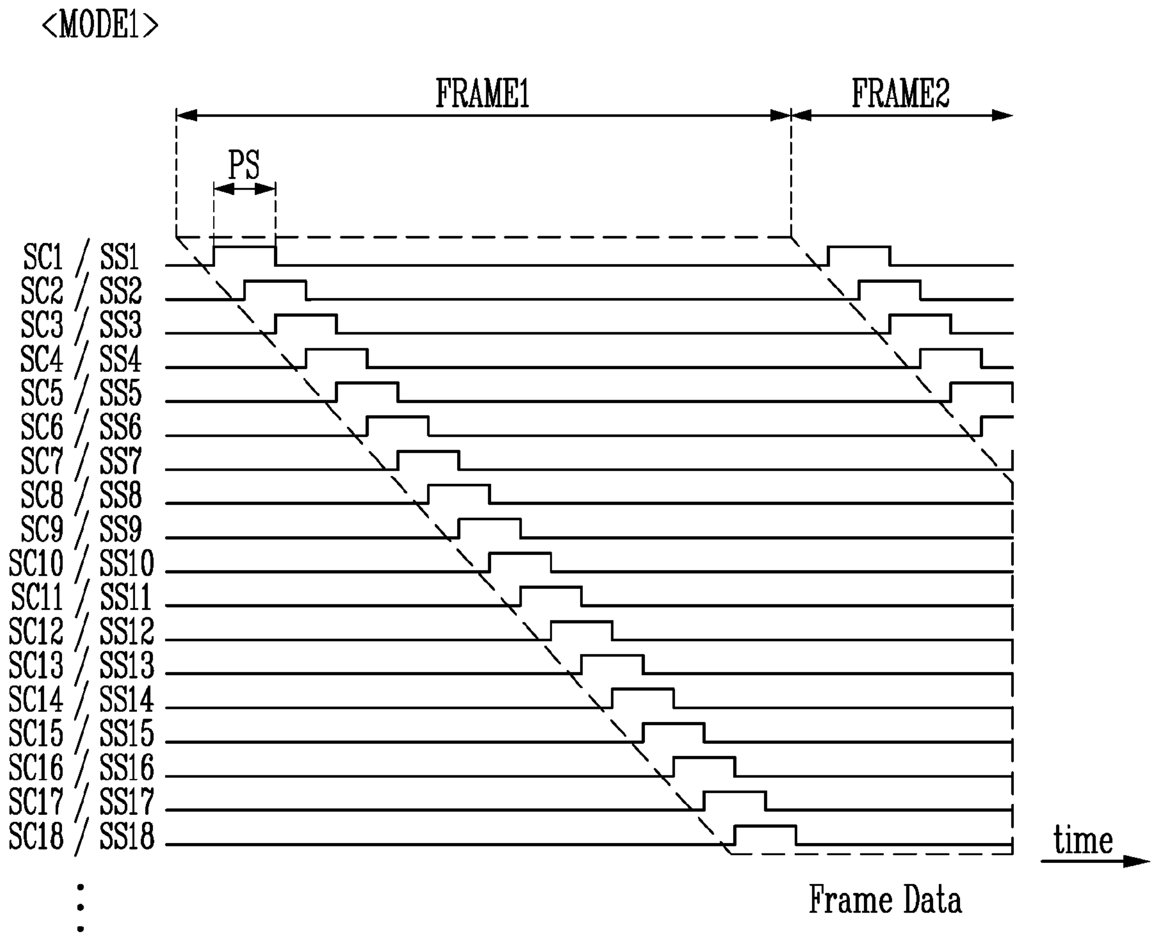
FIG. 3 is a waveform diagram for explaining the operation of the display device of FIG. 1 in a first mode according to some embodiments of the present disclosure.

FIG. 3 is a waveform diagram for explaining the operation of the display device of FIG. 1 in a first mode. Gate signals provided to gate lines with the lapse of time, that is, scan signals SC1 to SC18, . . . , provided to the scan lines (e.g., scan line SCL, see FIG. 1), and sensing scan signals SS1 to SS18, . . . , provided to sensing scan lines (e.g., sensing scan line SSL, see FIG. 1), are illustrated in FIG. 3.

Referring to FIGS. 1 to 3, during each of frame periods FRAME1 and FRAME2, the display device 100 (or the gate driver 120, see FIG. 1) may sequentially the scan signals SC1 to SC18, . . . to the scan lines once, and may also sequentially provide the sensing scan signals SS1 to SS18, . . . to the sensing scan lines once. A scan signal and a sensing scan signal corresponding to each other may have a turn-on voltage level during the same period. For example, the first scan signal SC1 and the first sensing scan signal SS1 may simultaneously (or concurrently) have a turn-on voltage level during a sub-period PS. As described above with reference to FIG. 2, a voltage difference between a data signal VDATA and a reference voltage VINIT may be stored in the pixel PXL, and the pixel PXL may emit light with a luminance corresponding to the voltage difference during the corresponding frame period (e.g., during a first frame period FRAME1).

Meanwhile, during each of the frame periods FRAME1 and FRAME2 in a first mode, the display device 100 may display only a frame image corresponding to frame data. The timing controller 140, described above with reference to FIG. 1, may generate only frame data based on input image data DATA1, and the data driver 130 may provide only data signals corresponding to the frame data to the display component 110. A previous frame image and a current frame image may be sequentially displayed only with a time interval corresponding to the sub-period PS, and an afterimage may occur while the previous frame image and the current frame image are overlapping each other. Accordingly, the display device 100 may be operated in the first mode so as to display a still image or an image having a low frame frequency (or a low refresh rate).

Figure 4:
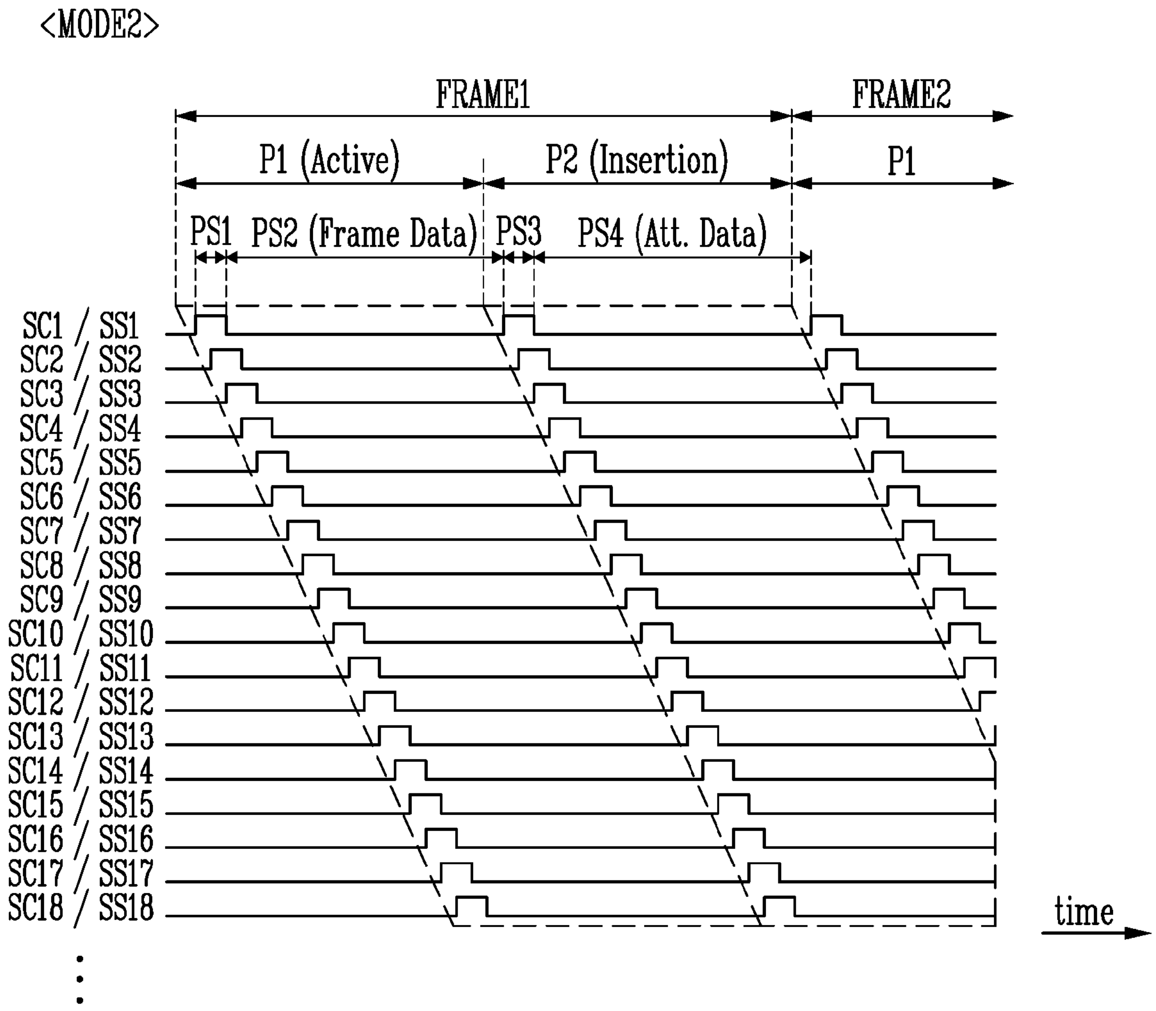
FIG. 4 is a waveform diagram for explaining embodiments of the operation of the display device of FIG. 1 in a second mode according to some embodiments of the present disclosure.

FIG. 4 is a waveform diagram for explaining embodiments of the operation of the display device of FIG. 1 in a second mode according to some embodiments of the present disclosure. Gate signals provided to gate lines with the lapse of time, that is, scan signals SC1 to SC18, . . . , provided to the scan lines (e.g., scan line SCL, see FIG. 1), and sensing scan signals SS1 to SS18, . . . , provided to sensing scan lines (e.g., sensing scan line SSL, see FIG. 1), are illustrated in FIG. 4.

Referring to FIGS. 1 to 4, each of frame periods FRAME1 and FRAME2 may include a first period P1 (or a first sub-frame period), and a second period P2 (or a second sub-frame period). The first period P1 may be a period during which the display component 110 displays a frame image corresponding to frame data (or a normal frame image), and the second period P2 may be a period during which the display component 110 displays an attenuated frame image corresponding to attenuated data.

According to some embodiments, during each of the frame periods FRAME1 and FRAME2), the display device 100 (or the gate driver 120) may provide a gate signal GS (see FIG. 2) to a single gate line GL (see FIG. 2) twice.

According to some embodiments, during a first sub-period PS1 of the first period P1, a first scan signal SC1 and a first sensing scan signal SS1, each having a turn-on voltage level, may be provided to the corresponding pixel (e.g., a pixel coupled to a first scan line and a first sensing scan line). Here, the turn-on voltage level may be a voltage level for turning on transistors in the pixel, and may be a voltage level for turning on each of the second and third transistors M2 and M3, described above with reference to FIG. 2. In this case, a first data signal may be written to the pixel, and the pixel may emit light with a valid luminance corresponding to the first data signal during a second sub-period PS2 of the first period P1. The first data signal may correspond to the frame data.

As illustrated in FIG. 4, the signal signals SC1 to SC18, . . . (and sensing scan signals SS1 to SS18, . . . ), each having a turn-on voltage level, may be sequentially provided to the scan lines (and the sensing scan lines), and pixels coupled to the scan lines may sequentially emit light.

Similar to the first sub-period PS1 of the first period P1, during a third sub-period PS3 of the second period P2, a first scan signal SC1 and a first sensing scan signal SS1, each having a turn-on voltage level, may be provided to the corresponding pixel (e.g., the pixel coupled to the first scan line and the first sensing scan line). In this case, a second data signal may be written to the pixel, and the pixel may emit light with a luminance corresponding to the second data signal during a fourth sub-period PS4 of the second period P2. The second data signal may correspond to attenuated data. Because the attenuated data is generated by attenuating the frame data, the luminance in the fourth sub-period PS4 may be lower than that in the second sub-period PS2.

That is, the display device 100 may display a normal frame image by enabling the pixel to emit light with a desired luminance during the first period P1 in one frame period, and may display an attenuated frame image by enabling the pixel to emit light with a relatively low luminance during the second period P2.

For reference, when a black image is displayed during the second period P2, frame images do not overlap each other, thus alleviating the occurrence of an afterimage. In other words, the motion picture response time (MPRT) of the display device 100 may be improved. For example, as the width of the second period P2 is larger, a proportion at which frame images overlap each other may be reduced, and thus the MPRT may be further improved. However, because a black image is displayed in the second period P2, luminance may be deteriorated with respect to the entire frame period. Also, as the second period P2 is wider, a flicker may occur while a black image is visually perceived.

In accordance with embodiments of the present disclosure, the attenuated frame image displayed in the second period P2 has a luminance lower than that of the normal frame image, thus alleviating the occurrence of an afterimage. For example, even if the attenuated frame image overlaps a subsequent frame image, the size of an afterimage may be reduced. That is, the MPRT of the display device 100 may be improved owing to the attenuated frame image. Also, because the attenuated frame image is not a black image, the deterioration of luminance may be alleviated, and the occurrence of a flicker may also be mitigated, compared to the case where a black image is displayed during the second period P2. In order to alleviate the deterioration of luminance, an image with a specific luminance (e.g., an image having a fixed low grayscale level) may be used instead of an attenuated frame image (and a black image).

Meanwhile, in order to apply a gate signal twice during one entire frame period in the second mode, the width of each of the first and third sub-periods PS1 and PS3 may be less than that of the sub-period PS (see FIG. 3), but the width is not limited thereto. For example, the width of the sub-period PS may be equal to that of the first sub-period PS1.

Further, although the width of the second period P2 is illustrated as being substantially identical to that of the first period P1 in FIG. 4, the width is not limited thereto. The width of the second period P2 may be different from that of the first period P1, and may vary.

Figure 5:
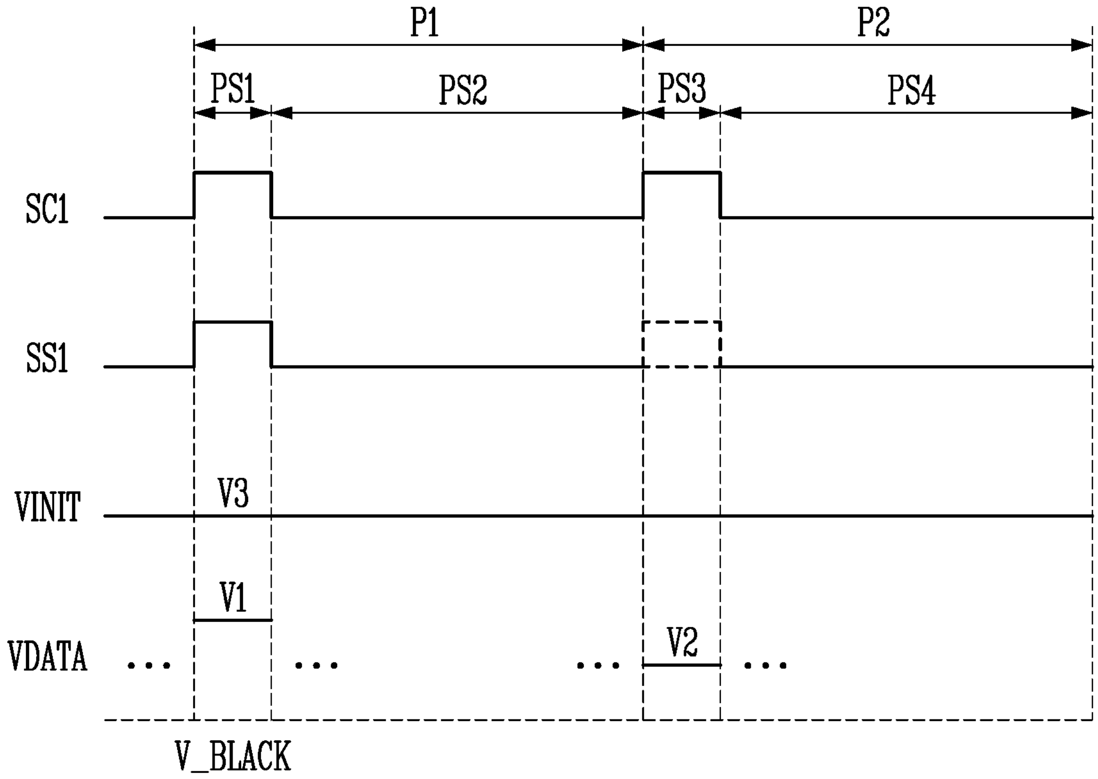
FIG. 5 is a waveform diagram for explaining embodiments of the operation of the pixel of FIG. 2 in the second mode according to some embodiments of the present disclosure.

FIG. 5 is a waveform diagram for explaining embodiments of the operation of the pixel of FIG. 2 in the second mode according to some embodiments of the present disclosure. It is assumed that the pixel PXL receives a first scan signal SC1 and a first sensing scan signal SS1, which are illustrated in FIG. 4.

Referring to FIGS. 1 to 5, during the first sub-period PS1 of the first period P1, the gate driver 120 may provide a first scan signal SC1 having a turn-on voltage level to the first scan line and provide a first sensing scan signal SS1 having a turn-on voltage level to the first sensing scan line.

Further, during the first sub-period PS1, the data driver 130 may provide a data signal VDATA to the data line DL. During the first sub-period PS1, the data signal VDATA may have a first voltage level V1 in accordance with frame data (or a first grayscale value included in the frame data and corresponding to the pixel PXL). The data signal VDATA having the first voltage level V1 may be different from a black voltage V_BLACK (or a black data signal) indicating a black image (or substantial non-emission of the pixel).

In this case, during the first sub-period PS1, the second transistor M2 may be turned on in response to the first scan signal SC1, and the data signal VDATA having the first voltage level V1 may be provided to the first electrode of the storage capacitor Cst. Also, the third transistor M3 may be turned on in response to the first sensing scan signal SS1, and the reference voltage VINIT applied to the readout line RL may be provided to the second electrode of the storage capacitor Cst. Therefore, a voltage corresponding to the difference between the data signal VDATA having the first voltage level V1 and the reference voltage VINIT may be stored in the storage capacitor Cst. The reference voltage VINIT may have, but is not limited to, a fixed voltage level (e.g., a third voltage level) during a frame period.

Thereafter, during the second sub-period PS2, when the second transistor M2 and the third transistor M3 are turned off, the amount of driving current flowing through the first transistor M1 may be determined in accordance with the voltage stored in the storage capacitor Cst (e.g., the first voltage level V1), and the light-emitting element LD may emit light with a luminance corresponding to the amount of driving current (or the first voltage level V1) during the second sub-period PS2 (or the first period P1).

Similar to the first sub-period PS1, during the third sub-period PS3 of the second period P2, the gate driver 120 may provide the first scan signal SC1 having a turn-on voltage level to the first scan line, and may provide the first sensing scan signal SS1 having a turn-on voltage level to the first sensing scan line.

During the third sub-period PS3, the data driver 130 may provide the data signal VDATA to the data line DL. During the third sub-period PS3, the data signal VDATA may have a second voltage level V2 in accordance with attenuated data (or a second grayscale value included in the attenuated data and corresponding to the pixel PXL). Because the attenuated data is generated by attenuating the frame data, the second voltage level V2 may be different from the first voltage level V1, and may be, for example, lower than the first voltage level V1. Furthermore, the data signal VDATA having the second voltage level V2 may be different from the black voltage V_BLACK (or a black data signal). In an example, when the first transistor M1 is implemented as a P-type transistor other than an N-type transistor, the second voltage level V2 may be higher than the first voltage level V1.

In this case, during the third sub-period PS3, a voltage corresponding to the difference between the data signal VDATA having the second voltage level V2 and the reference voltage VINIT may be stored in the storage capacitor Cst.

Thereafter, during a fourth sub-period PS4 (or the second period P2), the light-emitting element LD may emit light with a luminance corresponding to the second voltage level V2. For example, the light-emitting element LD may emit light with a luminance, lower than that in the second sub-period PS2, during the fourth sub-period PS4.

Figure 6A:
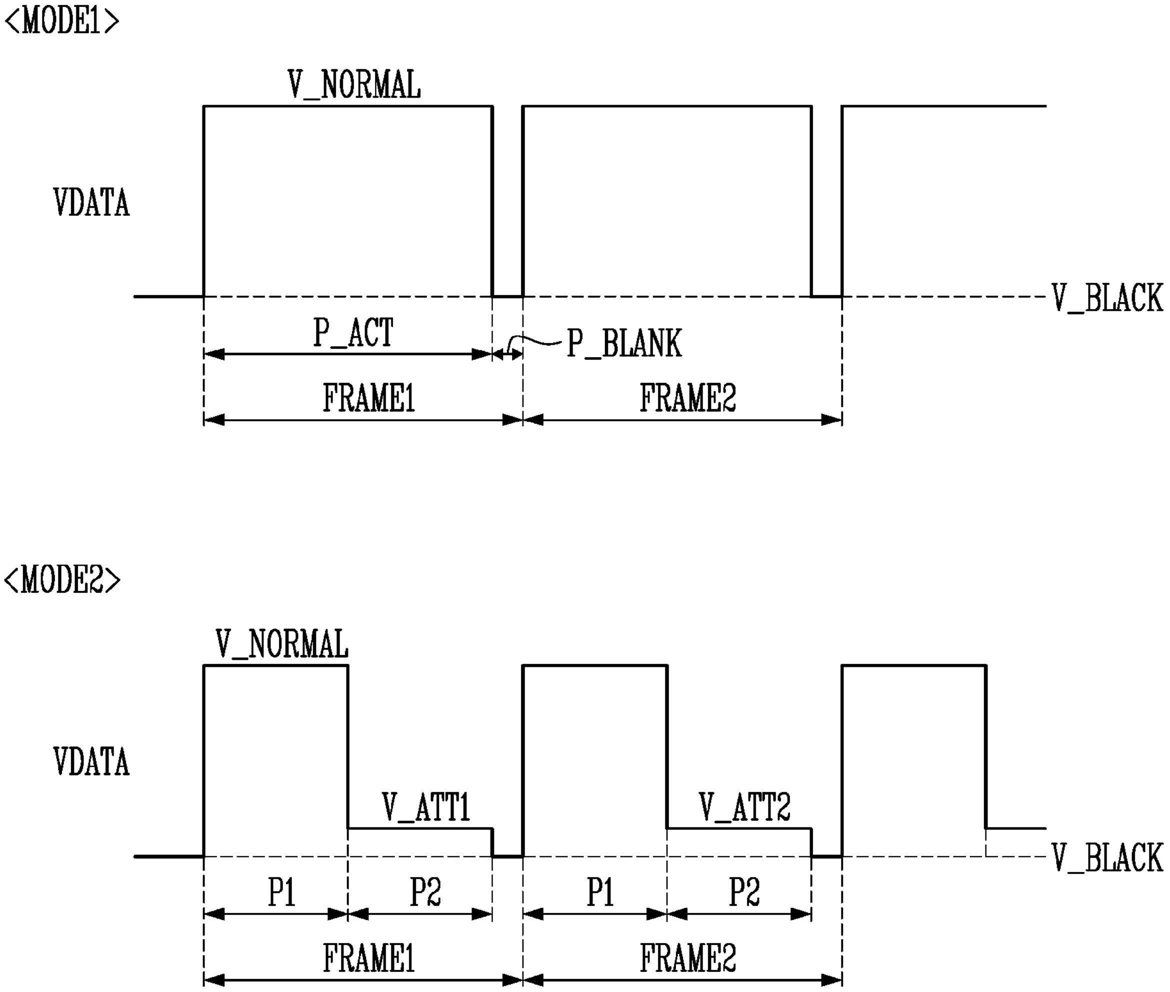
FIG. 6A is a diagram for explaining an example of a data signal used in the display device of FIG. 1 according to some embodiments of the present disclosure.

FIG. 6A is a diagram for explaining an example of a data signal used in the display device of FIG. 1.

Referring to FIGS. 1 to 6A, each of frame periods FRAME1 and FRAME2 may include an active period P_ACT and a blank period P_BLANK. The active period P_ACT may be a period during which the data signal VDATA is written to pixels in accordance with a scan operation, described above with reference to FIG. 3 (i.e., an operation of sequentially providing a gate signal). The blank period P_BLANK may be a period except the active period P_ACT, wherein a scan operation may not be performed during the blank period P_BLANK.

In a first mode, the data signal VDATA may have a normal voltage level V_NORMAL during the active period P_ACT. Here, the normal voltage level V_NORMAL may be a target voltage level for displaying a frame image. In other words, the normal voltage level V_NORMAL may mean that the data signal VDATA provided to the pixels has not been attenuated.

During the blank period P_BLANK, the data signal VDATA is not written to the pixels, and thus the data signal VDATA may have, but is not limited to, the black voltage V_BLACK (or a black data voltage).

In the second mode, the data signal VDATA may have the normal voltage level V_NORMAL during the first period P1, but may have a first attenuated voltage level V_ATT1 during the second period P2. Here, the first attenuated voltage level V_ATT1 may be a voltage level lower than the target voltage level for displaying a frame image. In other words, the first attenuated voltage level V_ATT1 may mean that the data signal VDATA provided to the pixels has been attenuated.

Because the attenuated data in the second period P2 is generated by attenuating the frame data in the first period P1, the first attenuated voltage level V_ATT1 corresponding to the attenuated data may be lower than the normal voltage level V_NORMAL. The first attenuated voltage level V_ATT1 may be different from the black voltage V_BLACK.

According to some embodiments, the first attenuated voltage level V_ATT1 may be fixed in the second period P2. In other words, the attenuation ratio of the data signal VDATA to the normal voltage level V_NORMAL may be identical for each pixel, or alternatively, a fixed attenuation ratio may be used as the attenuation ratio. However, the attenuation ratio is not limited thereto, but may vary dependent on the load (or luminance) for each region (for each location) of a frame image.

According to some embodiments, the first attenuated voltage level V_ATT1 in the first frame period FRAME1 may differ from a second attenuated voltage level V_ATT2 in the second frame period FRAME2. In other words, the attenuation ratio of the second attenuated voltage level V_ATT2 to the normal voltage level V_NORMAL in the second frame period FRAME2 may be different from the attenuation ratio of the first attenuated voltage level V_ATT1 to the normal voltage level V_NORMAL in the first frame period FRAME1. For example, the attenuation ratio may be determined or applied differently depending on the load (or luminance) of the frame image.

For example, when the load of the frame image is relatively high or the luminance of the frame image is relatively high, a relatively large afterimage may occur. In consideration of this, when the load of the frame image is relatively high or the luminance of the frame image is relatively high, a relatively high attenuation ratio may be applied, and the attenuated voltage level in the corresponding frame period may be relatively low. However, the present disclosure is not limited thereto.

Figure 6B:
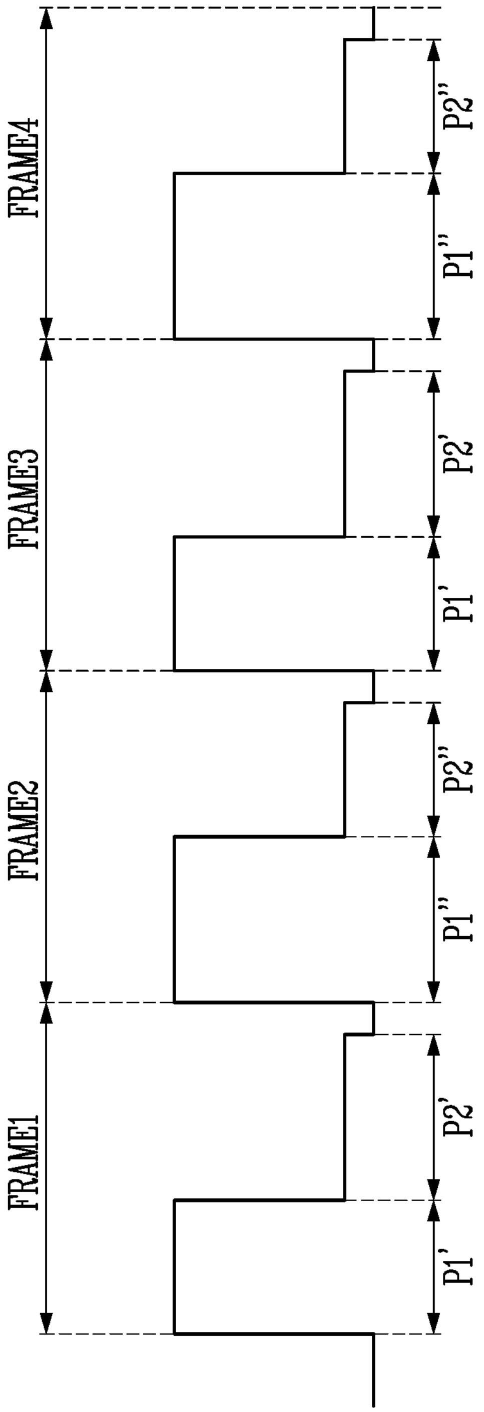
FIG. 6B is a diagram for explaining an example of the data signal used in the display device of FIG. 1 according to some embodiments of the present disclosure.

FIG. 6B is a diagram for explaining an example of the data signal used in the display device of FIG. 1. In FIG. 6B, an example of a data signal VDATA in a second mode is illustrated.

Referring to FIGS. 6A and 6B, the data signal VDATA of FIG. 6B is substantially identical or similar to the data signal VDATA in the second mode of FIG. 6A, except for the widths of first periods P1' and P1" and the widths (or duty cycles) of second periods P2' and P2", and thus some detailed descriptions thereof may be omitted.

As illustrated in FIG. 6B, the widths (or duty cycles) of the second periods P2' and P2" may vary for each frame period. In an example, during a first frame period FRAME1, the duty cycle of the second period P2' may be about 60%. In an example, during a second frame period FRAME2, the duty cycle of the second period P2" may be about 40%.

As described above, as the width of the second period P2' or P2" becomes larger, the occurrence of an afterimage may be further alleviated, or alternatively, motion picture response characteristics such as MPRT may be further improved. When an afterimage appears differently depending on the load of a frame image, the widths (or duty cycles) of the second periods P2' and P2" may be set to different values for respective frame periods based on the load of at least a portion of the frame image.

According to some embodiments, the second periods P2' and P2" may alternately have a first duty cycle and a second duty cycle in units of a frame period. In an example, during the first frame period FRAME1 and a third frame period FRAME3, the duty cycle of the second period P2' may be about 60%. In an example, during the second frame period FRAME2 and a fourth frame period FRAME4, the duty cycle of the second period P2" may be about 40%. When it is difficult to adjust the duty cycle of each of the second periods P2' and P2" to 50%, the average duty cycle of the second periods P2' and P2" may be adjusted using duty cycles close to 50% (e.g., duty cycles of 40% and 60%). The average duty cycle of the second periods P2' and P2" may be more precisely controlled, and both the occurrence of an afterimage and the deterioration of luminance which have a trade-off relationship may be suitably improved.

According to some embodiments, the duty cycles of the second periods P2' and P2" may vary using dithering technology. In this case, a flicker (i.e., a flicker that may occur when a second period having the same duty cycle is repeated) may be alleviated.

Figure 7A:
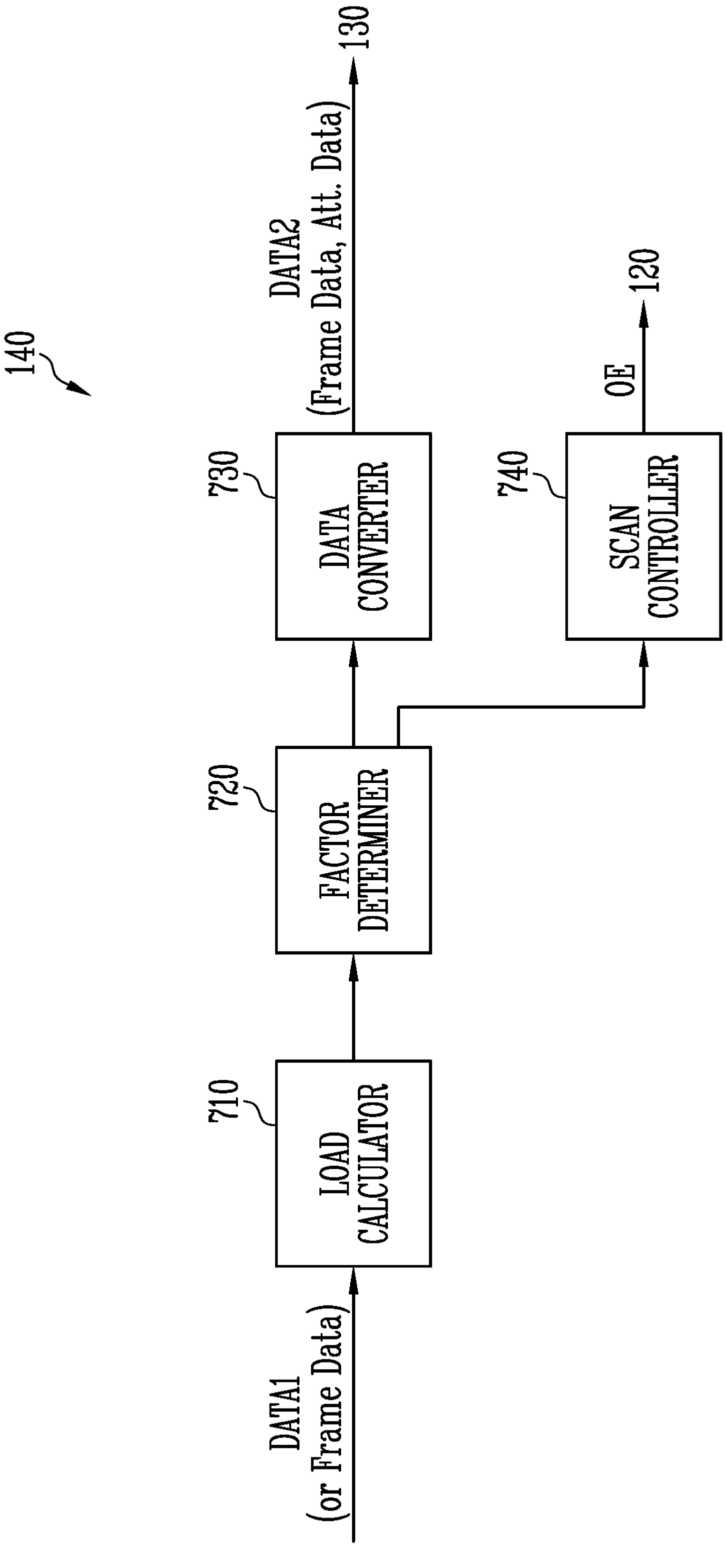
FIG. 7A is a block diagram illustrating embodiments of a timing controller included in the display device of FIG. 1 according to some embodiments of the present disclosure.

FIG. 7A is a block diagram illustrating embodiments of the timing controller included in the display device of FIG. 1 according to some embodiments of the present disclosure. In FIG. 7A, in relation to a function of generating attenuated data, the timing controller 140 is illustrated in brief.

Referring to FIGS. 1 and 7A, the timing controller 140 may generate image data DATA2 based on input image data DATA1. As described above, the image data DATA2 may include frame data and attenuated data.

The timing controller 140 may include a load calculator 710 (or a load calculation circuit), a factor determiner 720 (or a factor determination circuit), and a data converter 730 (or a data conversion circuit). Each of the load calculator 710, the factor determiner 720, and the data converter 730 may be implemented using hardware including a logic circuit, a memory element, etc., or implemented using software.

The load calculator 710 may calculate the load of input image data DATA1 (or frame data) based on the input image data DATA1. For example, the load calculator 710 may calculate the average of grayscale values included in at least a portion of the input image data DATA1, and may calculate the load of the input image data DATA1 based on the average. In an example, the load calculator 710 may determine the average to be the load. In an example, the load calculator 710 may determine the load (or the intensity of the load indicating a high or low level) by comparing the average with preset reference values.

According to some embodiments, when the display component 110 (see FIG. 1) is divided into a plurality of regions by a preset block, the load calculator 710 may calculate loads for respective regions. That is, a plurality of local loads, other than the entire load, may be calculated.

The factor determiner 720 may determine a scaling factor (or an attenuation ratio), which is a factor used to generate attenuated data, based on the load. For example, the factor determiner 720 may determine the scaling factor corresponding to the load using a lookup table. When the load calculator 710 determines whether the load is high or low (e.g., high/middle/low load), the factor determiner 720 may be omitted, and the output value of the load calculator 710 may be used as the scaling factor. For example, as the load increases, the scaling factor may decrease, but the present disclosure is not limited thereto.

When the load calculator 710 calculates the plurality of local loads, the factor determiner 720 may determine scaling factors for respective local loads.

The data converter 730 may generate the image data DATA2 based on the input image data DATA1 and the scaling factor. For example, the data converter 730 may convert the input image data DATA1 into frame data having a format conforming to a pixel array in the display component 110 (see FIG. 1). According to some embodiments, the data converter 730 may also generate the frame data by compensating for the input image data DATA1 using typical compensation technologies such as optical compensation or degradation compensation.

For example, the data converter 730 may generate attenuated data (or a second grayscale value included in the attenuated data) by multiplying the scaling factor by the frame data (or a first grayscale value included in the frame data) (i.e., "attenuated data=frame data×β" where β is a scaling factor satisfying $0<\beta<1$).

The data converter 730 (or the timing controller 140) may generate the frame data during or before the first period P1, described with reference to FIG. 4, and may generate the attenuated data using both the frame data (i.e., the frame data generated during the first period P1) and the scaling factor during or before the second period P2.

When the load calculator 710 calculates the plurality of local loads and the factor determiner 720 determines scaling factors for respective local loads, the data converter 730 may generate the attenuated data using the framer data and the scaling factors. For example, through a method of multiplying each scaling factor by a corresponding portion of the frame data (or sub-frame data), the attenuated data may be generated.

The image data DATA2 (i.e., frame data and attenuated data) may be provided to the data driver 130.

Meanwhile, although the load calculator 710 is described as using the input image data DATA1, the present disclosure is not limited thereto. For example, the load calculator 710 may use the frame data calculated in accordance with the first period P1, and may calculate the load of the frame data.

According to some embodiments, the timing controller 140 may further include a scan controller 740.

In this case, the factor determiner 720 may determine the duty cycle of the second period P2 (see FIG. 4) based on the load, the scan controller 740 may output an enable signal OE based on the duty cycle, and the gate driver 120 may output a gate signal in response to the enable signal OE during the second period P2. That is, the enable signal OE may instruct the output (or output timing) of the gate signal during the second period P2. As described above with reference to FIG. 6B, the duty cycles (or widths) of second periods P2' and P2" in the frame periods may be set to different values.

As described above, attenuated data in the second period P2 (see FIG. 4) may be generated by attenuating the frame data in the first period P1 (see FIG. 4). Also, the attenuation ratio (or the scaling factor) may vary depending on the load of the input image data DATA1 (or the frame data in the first period P1). Furthermore, the duty cycle of the second period P2 may also vary depending on the load of the input image data DATA1 (or the frame data in the first period P1).

Meanwhile, although it is described that the scaling factor and/or the duty cycle of the second period P2 vary depending on the load with reference to FIG. 7A, the present disclosure is not limited thereto. For example, the load calculator 710 and the factor determiner 720 may be omitted, and the data converter 730 may use a preset scaling factor.

Figure 7B:
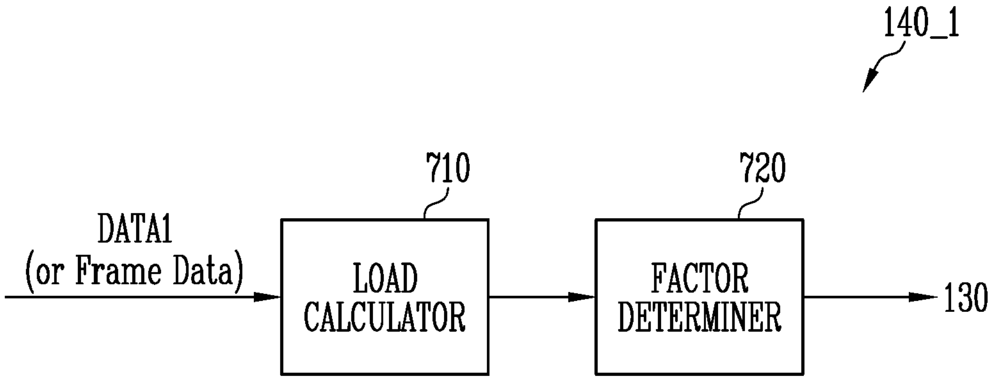
FIG. 7B is a block diagram illustrating embodiments of the timing controller included in the display device of FIG. 1 according to some embodiments of the present disclosure.
Figure 7C:
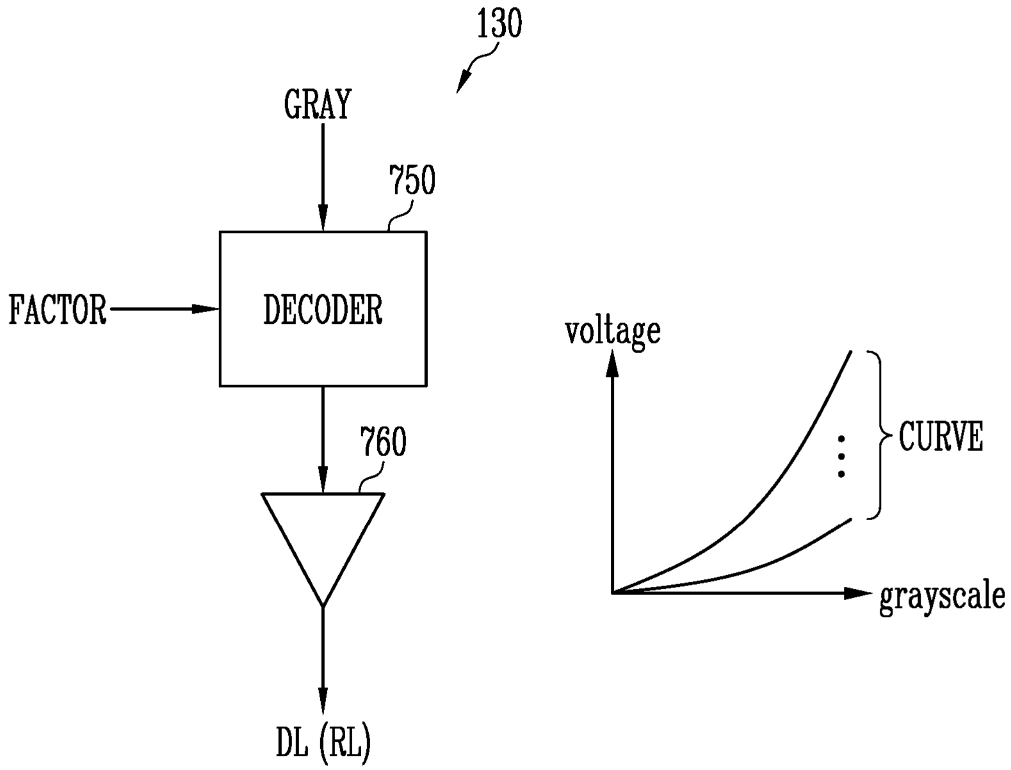
FIG. 7C is a block diagram illustrating embodiments of a data driver included in the display device of FIG. 1 according to some embodiments of the present disclosure.

FIG. 7B is a block diagram illustrating embodiments of the timing controller included in the display device of FIG. 1 according to some embodiments of the present disclosure. FIG. 7C is a block diagram illustrating embodiments of the data driver included in the display device of FIG. 1 according to some embodiments of the present disclosure.

Referring to FIGS. 1, 7A, 7B, and 7C, the timing controller 140_1 of FIG. 7B determines only a scaling factor, and the data driver 130 of FIG. 7C may attenuate a data signal or generate an attenuated data signal based on the scaling factor.

Because the timing controller 140_1 includes a load calculator 710 and a factor determiner 720, which have been described above with reference to FIG. 7A, some detailed descriptions thereof may be omitted.

The data driver 130 may include a decoder 750 and a buffer 760 (or an output buffer).

The decoder 750 may convert a grayscale value GRAY into a data signal (or a data voltage). For example, the decoder 750 may be implemented as a digital-to-analog converter (DAC), and may be configured to select one of gamma voltages corresponding to the grayscale values GRAY included in frame data and to output the selected gamma voltage as a data signal.

According to some embodiments, the decoder 750 may vary the range of an output voltage based on a scaling factor FACTOR (i.e., the scaling factor provided from the factor determiner 720). For example, the decoder 750 may use a gamma curve corresponding to the scaling factor, among a plurality of gamma curves (i.e., gamma curves having different voltage ranges). For example, when the scaling factor FACTOR is not provided or when the value of the scaling factor FACTOR is '1', a gamma curve having the widest output voltage range, among the plurality of gamma curves, may be used. When the scaling factor FACTOR has a minimum value (e.g., 0.1), a gamma curve having the narrowest output voltage range (or the lowest voltage range), among the plurality of gamma curves, may be used.

Because the data driver 130 varies the data signal based on the scaling factor FACTOR, the second voltage level V2 in the second period P2, illustrated in FIG. 5, may be proportional to the first voltage level V1 in the first period P1.

As described above, the data driver 130 may attenuate the data signal, instead of allowing the timing controller 140 to generate attenuated data.

Meanwhile, the load calculator 710 and the factor determiner 720 of FIG. 7B may be omitted, and the data driver 130 may use a preset scaling factor.

Figure 8A:
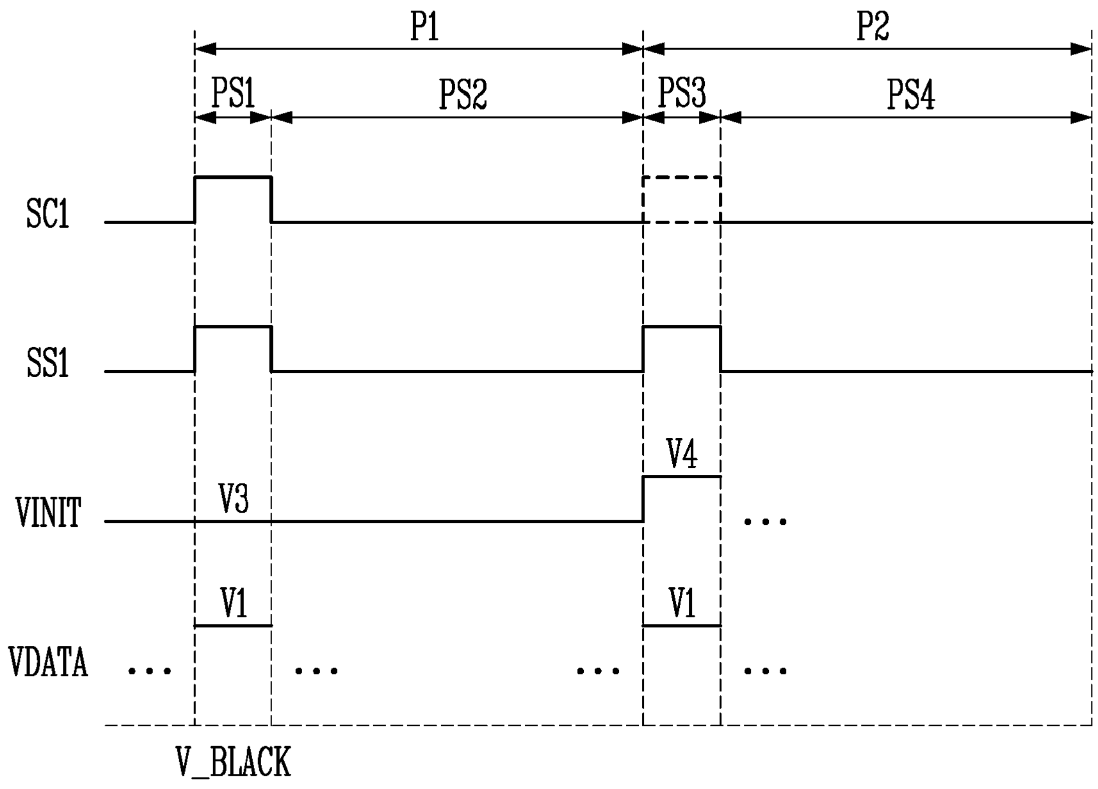
FIG. 8A is a waveform diagram for explaining embodiments of the operation of the pixel of FIG. 2 in the second mode according to some embodiments of the present disclosure.
Figure 8B:
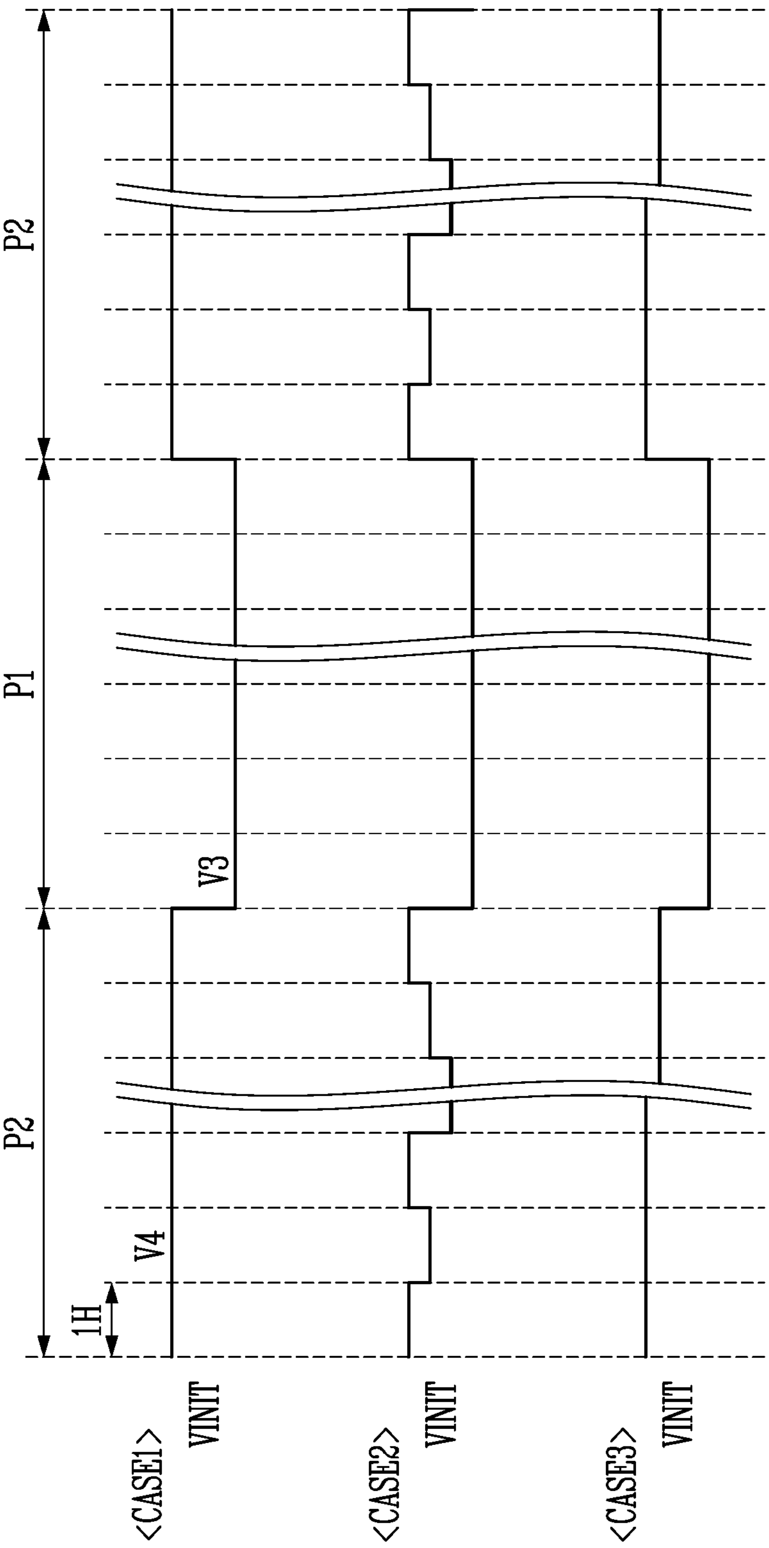
FIG. 8B is a waveform diagram for explaining embodiments of the operation of the display device of FIG. 1 in the second mode according to some embodiments of the present disclosure.

FIG. 8A is a waveform diagram for explaining embodiments of the operation of the pixel of FIG. 2 in the second mode according to some embodiments of the present disclosure. It is assumed that the pixel PXL receives a first scan signal SC1 and a first sensing scan signal SS1, illustrated in FIG. 4. FIG. 8B is a waveform diagram for explaining embodiments of the operation of the display device of FIG. 1 in the second mode according to some embodiments of the present disclosure.

First, referring to FIGS. 1 to 5 and 8A, the data driver 130 may vary a reference voltage VINIT, instead of varying (or attenuating) a data signal VDATA during the second period P2.

Because the operation of the pixel PXL according to the embodiments described with respect to FIG. 8A is substantially identical or similar to that of the pixel PXL according to the embodiments described with respect to FIG. 5, except for the reference voltage VINIT and the data signal VDATA in the second period P2, some detailed descriptions thereof may be omitted.

During the third sub-period PS3 of the second period P2, the data driver 130 may provide the data signal VDATA to the data line DL. During the third sub-period PS3, the data signal VDATA may have a first voltage level V1 in accordance with frame data.

Also, the data driver 130 may provide the reference voltage VINIT to the readout line RL. During the third sub-period PS3, the reference voltage VINIT may have a fourth voltage level V4 (or a second reference voltage) different from the third voltage level V3 (or the first reference voltage). For example, the fourth voltage level V4 may be higher than the third voltage level V3. For example, when the voltage range of the data signal VDATA ranges from about 2 V to 10 V, the third voltage level V3 may be about 2 V, and the fourth voltage level V4 may be about 5 V.

In this case, during the third sub-period PS3, a voltage corresponding to the difference between the data signal VDATA having the first voltage level V1 and the reference voltage VINIT having the fourth voltage level V4 may be stored in the storage capacitor Cst. For example, when the first voltage level V1 is 8 V and the fourth voltage level V4 is 5 V, a voltage of 3 V may be stored in the storage capacitor Cst. Compared to the first sub-period PS1 (or the first period P1), the voltage to be stored in the storage capacitor Cst may be decreased.

Thereafter, during the fourth sub-period PS4 (or the second period P2), the light-emitting element LD may emit light with a luminance corresponding to the voltage stored in the storage capacitor Cst. For example, the light-emitting element LD may emit light with a luminance, lower than that in the second sub-period PS2, during the fourth sub-period PS4.

That is, the light-emitting element LD emits light in accordance with the voltage stored in the storage capacitor Cst (or the gate-source voltage of the first transistor M1), and the stored voltage may correspond to the difference between the data signal VDATA and the reference voltage VINIT.

The same effect as that of the embodiments described with respect to FIG. 5 (i.e., the case where the voltage level of the data signal VDATA is decreased) may be obtained by increasing the voltage level of the reference voltage VINIT during the second period P2.

According to some embodiments, the reference voltage VINIT in the second period P2 may remain constant or may be fixed at the fourth voltage level V4.

As in first case CASE1 illustrated in FIG. 8B, the reference voltage VINIT may remain constant at the third voltage level V3 during the first period P1, and may remain constant at the fourth voltage level V4 during the second period P2.

For example, during the second period P2, the reference voltage VINIT may be fixed at a preset voltage level. In an example, even if the load of frame data varies, the reference voltage VINIT may not vary during the second period P2.

In an example, during the second period P2, the reference voltage VINIT may vary depending on the load of frame data. For example, as the load of the frame data, described above with reference to FIG. 7A, increases, the voltage level of the reference voltage VINIT may increase during the second period P2. However, the reference voltage VINIT is not limited thereto.

According to some embodiments, during the second period P2, the reference voltage VINIT may vary. For example, during the second period P2, the reference voltage VINIT may vary by stages at least twice.

As in second case CASE2 or third case CASE3 illustrated in FIG. 8B, the reference voltage VINIT may vary at cycles of at least 1 horizontal period (1H) in the second period P2. Here, the 1 horizontal period (1H) may be a time allocated to write a data signal VDATA to one pixel (or pixel row).

For example, as in second case CASE2, the reference voltage VINIT may vary by stages at cycles of 1 horizontal period (1H) in the second period P2. For example, the reference voltage VINIT may have a voltage level corresponding to the attenuated data, described above with reference to FIG. 5. For example, the data driver 130 may include the configuration, illustrated in FIG. 7C, in order to supply the reference voltage VINIT to the readout line RL during the second period P2, and may provide the reference voltage VINIT having a voltage level corresponding to a grayscale value GRAY (or a scaled grayscale value) to the readout line RL.

In an example, as in third case CASE3, the reference voltage VINIT may vary by stages at cycles of a specific time longer than the 1 horizontal period (1H) in the second period P2. As described above with reference to FIG. 7A, when the display component 110 is divided into a plurality of regions, and local loads (or average grayscale values) for respective regions are calculated, the reference voltage VINIT may vary in accordance with the local loads (or the average grayscale values) at cycles of the specific time corresponding to each region.

As described above, during the second period P2, the reference voltage VINIT may vary. Furthermore, the reference voltage VINIT may vary depending on the load of the frame data.

Figure 9:
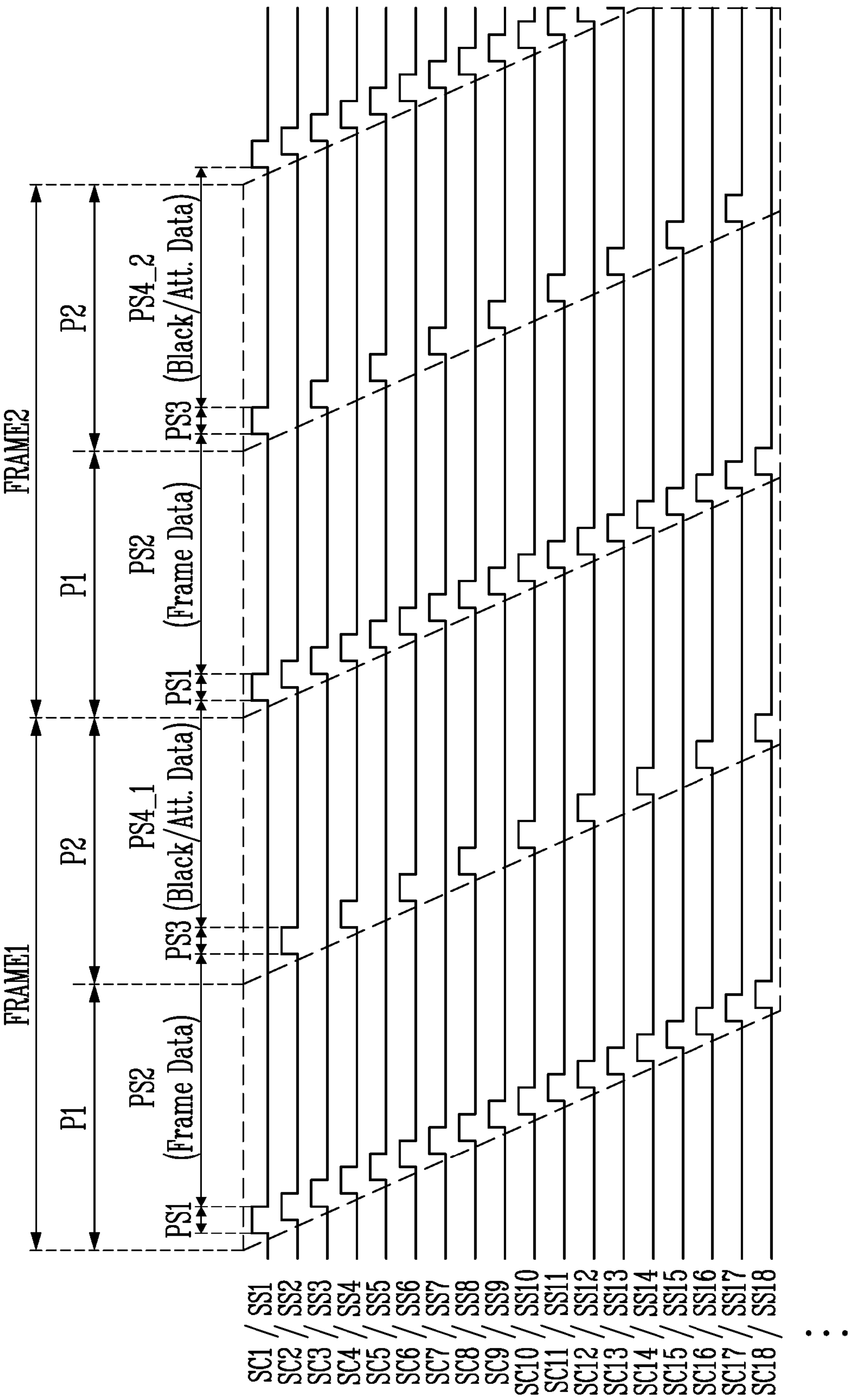
FIG. 9 is a waveform diagram for explaining embodiments of the operation of the display device of FIG. 1 in the second mode according to some embodiments of the present disclosure.

FIG. 9 is a waveform diagram for explaining aspects of embodiments of the operation of the display device of FIG. 1 in the second mode according to some embodiments of the present disclosure. In FIG. 9, a drawing corresponding to FIG. 4 is illustrated.

Referring to FIGS. 1 to 4 and 9, the embodiments described with respect to FIG. 9 may be substantially identical or similar to the embodiments described with respect to FIG. 4, except for the fact that only some of scan signals SC1 to SC18, . . . and only some of sensing scan signals SS1 to SS18, . . . have a turn-on voltage level during the second period P2. Thus, some repeated descriptions thereof may be omitted.

According to some embodiments, the display device 100 (or the gate driver 120) may provide a gate signal only to some of the gate lines during the second period P2 of a first frame period FRAME1, and may provide a gate signal only to others of the gate lines during the second period P2 of a second frame period FRAME2.

According to some embodiments, the display device 100 (or the gate driver 120) may provide a gate signal only to even-numbered gate lines, among the gate lines, during the second period P2 of the first frame period FRAME1 (or an odd-numbered frame period), and may provide a gate signal only to odd-numbered gate lines, among the gate lines, during the second period P2 of the second frame period FRAME2 (or an even-numbered frame period). That is, the gate signal may be alternately provided to the odd-numbered gate lines and the even-numbered gate lines (i.e., interlaced scanning).

As illustrated in FIG. 9, during the second period P2 (or the third sub-period PS3) of the first frame period FRAME1, a second scan signal SC2 and a second sensing scan signal SS2, each having a turn-on voltage level, may be provided to the corresponding pixel. Similarly, even-numbered scan signals SC2, SC4, . . . , SC18, . . . and even-numbered sensing scan signals SS2, SS4, . . . , SS18, . . . may be provided to corresponding pixels, for example, even-numbered pixels (or pixels located in even-numbered rows).

In this case, a second data signal may be written to the even-numbered pixels, and each of the even-numbered pixels may emit light with a luminance corresponding to the second data signal during the second period P2 (or the fourth sub-period PS4_1) of the first frame period FRAME1. The second data signal may correspond to attenuated data Att. Data or black data (i.e., data indicating a black image). On the other hand, the second data signal may correspond to low-luminance data (e.g., data indicating a grayscale image). Therefore, luminance in the second period P2 of the first frame period FRAME1 may be lower than that in the first period P1 of the first frame period FRAME1. Therefore, the occurrence of an afterimage may be alleviated, and MPRT of the display device 100 may be improved (e.g., prevented or reduced). Also, the deterioration of luminance may be mitigated (e.g., reduced). For example, compared to the embodiments described with respect to FIG. 5, the deterioration of luminance may be further mitigated.

During the second period P2 (or the third sub-period PS3) of the second frame period FRAME2, a first scan signal SC1 and a first sensing scan signal SS1, each having a turn-on voltage level, may be provided to the corresponding pixel. Similarly, odd-numbered scan signals SC1, SC3, . . . , SC17, . . . and odd-numbered sensing scan signals SS1, SS3, . . . , SS17, . . . may be respectively provided to corresponding pixels, for example, odd-numbered pixels (or pixels located in odd-numbered rows).

In this case, a second data signal may be written to the odd-numbered pixels, and each of the odd-numbered pixels may emit light with a luminance corresponding to the second data signal during the second period P2 (or the fourth sub-period PS4_2) of the second frame period FRAME2. The second data signal may correspond to attenuated data Att. Data or black data. Therefore, luminance in the second period P2 of the second frame period FRAME2 may be lower than that in the first period P1 of the second frame period FRAME2.

Meanwhile, although the case where the gate signal is alternately provided to odd-numbered gate lines and even-numbered gate lines in units of two gate lines is illustrated in FIG. 9, the present disclosure is not limited thereto. For example, the gate driver 120 may alternately provide the gate signal in units of three gate lines.

Figure 10:
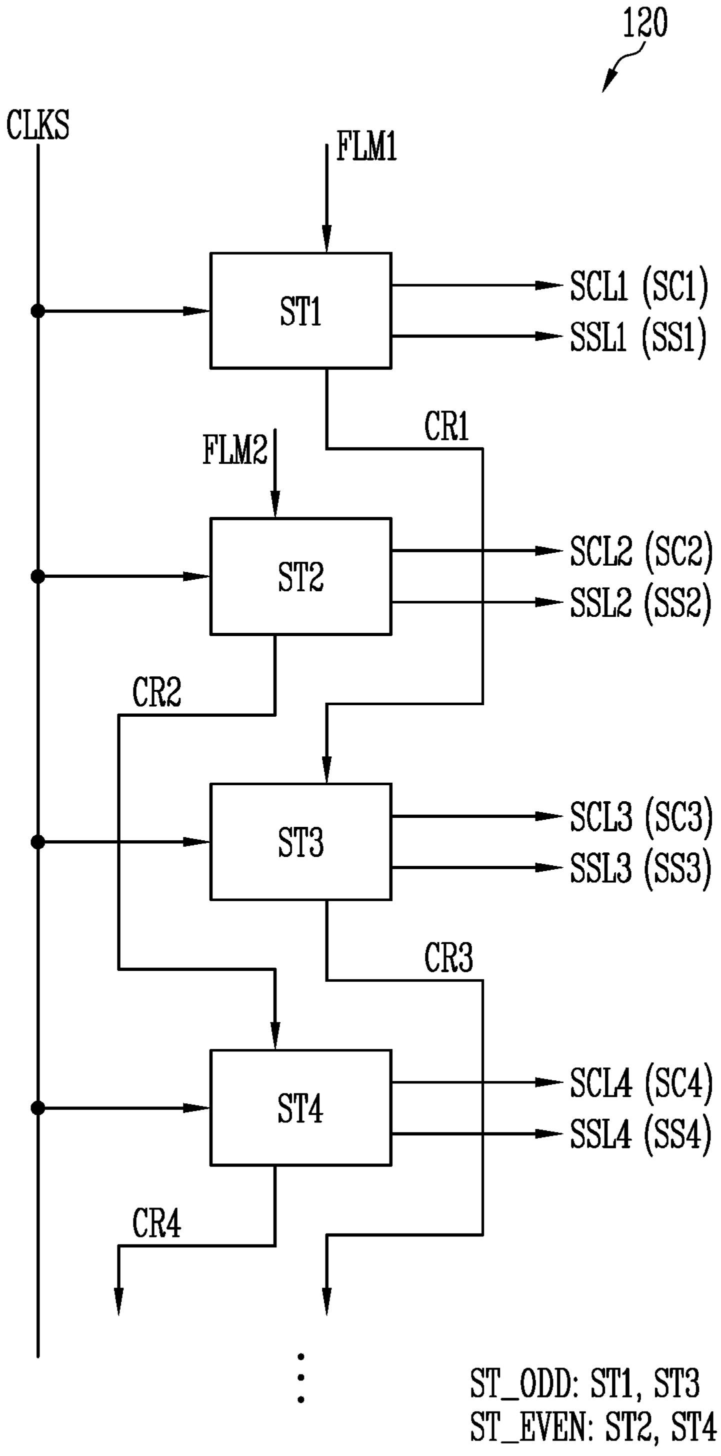
FIG. 10 is a block diagram illustrating embodiments of a gate driver included in the display device of FIG. 1 according to some embodiments of the present disclosure.

FIG. 10 is a block diagram illustrating aspects of embodiments of the gate driver included in the display device of FIG. 1.

Referring to FIGS. 1, 9, and 10, the gate driver 120 may include a plurality of stages ST1, ST2, ST3, ST4, . . . . The stages ST1, ST2, ST3, ST4, . . . may correspond to or may be coupled to scan lines SCL1, SCL2, SCL3, SCL4, . . . (and sensing scan lines SSL1, SSL2, SSL3, SSL4, . . . ), respectively.

Each of the stages ST1, ST2, ST3, ST4, . . . may be coupled to clock lines, and may receive clock signals CLKS.

Each of the stages ST1, ST2, ST3, ST4, . . . may receive a start signal FLM1 or FLM2 or a carry signal of a previous stage (e.g., one of carry signals CR1, CR2, CR3, CR4, . . . ), and may generate a scan signal and a sensing scan signal by shifting the start signal FLM1 or FLM2 or the carry signal of the previous stage in response to the clock signals CLKS. The start signal FLM1 or FLM2 may be provided from the timing controller 140 (see FIG. 1).

Meanwhile, each of the stages ST1, ST2, ST3, ST4, . . . may output the corresponding clock signal, among the clock signals CLKS, as the scan signal and/or the sensing scan signal in response to the start signal FLM1 or FLM2 or the carry signal of the previous stage.

For example, the first stage ST1 may receive the first start signal FLM1, generate a first scan signal SC1, a first sensing scan signal SS1, and a first carry signal CR1 by shifting the first start signal FLM1, provide the first scan signal SC1 to a first scan line SCL1, and provide the first sensing scan signal SS1 to a first sensing scan line SSL1. The second stage ST2 may receive the second start signal FLM2, generate a second scan signal SC2, a second sensing scan signal SS2, and a second carry signal CR2 by shifting the second start signal FLM2, provide the second scan signal SC2 to a second scan line SCL2, and provide the second sensing scan signal SS2 to a second sensing scan line SSL2. The third stage ST3 may receive the first carry signal CR1, generate a third scan signal SC3, a third sensing scan signal SS3, and a third carry signal CR3 by shifting the first carry signal CR1, provide the third scan signal SC3 to a third scan line SCL3, and provide the third sensing scan signal SS3 to a third sensing scan line SSL3. The fourth stage ST4 may receive the second carry signal CR2, generate a fourth scan signal SC4, a fourth sensing scan signal SS4, and a fourth carry signal CR4 by shifting the second carry signal CR2, provide the fourth scan signal SC4 to a fourth scan line SCL4, and provide the fourth sensing scan signal SS4 to a fourth sensing scan line SSL4.

During the first sub-period PS1 of the first frame period FRAME1, when the first start signal FLM1 and the second start signal FLM2 are provided to the gate driver 120, the gate driver 120 (or the stages ST1, ST2, ST3, ST4, . . . ) may sequentially output the scan signals SC1, SC2, SC3, SC4, . . . (and sensing scan signals SS1, SS2, SS3, SS4, . . . ).

During the third sub-period PS3 of the first frame period FRAME1 of FIG. 9, when only the second start signal FLM2 is provided to the gate driver 120, only the even-numbered stages ST_EVEN of the gate driver 120 may sequentially output even-numbered scan signals SC2, SC4, . . . (and even-numbered sensing scan signals SS2, SS4, . . . ).

During the third sub-period PS3 of the second frame period FRAME2 of FIG. 9, when only the first start signal FLM1 is provided to the gate driver 120, only the odd-numbered stages ST_ODD of the gate driver 120 may sequentially output odd-numbered scan signals SC1, SC3, . . . (and odd-numbered sensing scan signals SS1, SS3, . . . ).

While the spirit and scope of the present disclosure is described in detail by the foregoing embodiments, it should be noted that the embodiments are merely descriptive and should not be considered limiting. Further, it should be understood by those skilled in the art that various changes, substitutions, and alternations may be made herein without departing from the scope of the disclosure as defined by the accompanying claims.

The scope of embodiments according to the present disclosure are not limited by detailed descriptions of the present specification, and should be defined by the accompanying claims. Further, all changes or modifications of embodiments according to the present disclosure derived from the meanings and scope of the claims, and equivalents thereof should be construed as being included in the scope of embodiments according to the present disclosure.

The display device according to some embodiments of the present disclosure may display frame images corresponding to pieces of frame data so that an attenuated frame image corresponding to attenuated data may be displayed between the frame images. The attenuated frame image may alleviate or reduce the deterioration of luminance of all images (e.g., video) while preventing or reducing the occurrence of afterimages of frame images.

Effects according to the embodiments are not limited by the foregoing descriptions, and various effects are included in the present specification.

What is claimed is:

1. A display device, comprising:

a display panel including a pixel electrically coupled to a gate line and a data line;

a gate driver configured to provide a gate signal to the gate line;

a data driver configured to provide a data signal to the data line; and a timing controller configured to generate frame data based on input image data provided from an external device and to generate attenuated data by downscaling grayscale values included in the frame data, wherein the gate driver is configured to sequentially provide a first gate signal and a second gate signal to the gate line during a first frame period, wherein the data driver is configured to provide a first data signal to the data line in response to the first gate signal, and to provide a second data signal to the data line in response to the second gate signal, wherein the second data signal is different from the first data signal and varies dependent on the first data signal, wherein the data driver is configured to generate the first data signal based on the frame data and to generate the second data signal based on the attenuated data, and wherein the timing controller is configured to calculate a second grayscale value included in the attenuated data by multiplying a scaling factor by a first grayscale value included in the frame data.

2. The display device according to claim 1, wherein the second data signal is different from a black data signal corresponding to a black image.

3. The display device according to claim 1, wherein: the first frame period includes a first sub-frame period and a second sub-frame period, and the pixel is configured to emit light with a luminance corresponding to the first data signal during the first sub-frame period, and to emit light with a luminance corresponding to the second data signal during the second sub-frame period.

4. The display device according to claim 3, wherein the second grayscale value corresponding to the second data signal is proportional to the first grayscale value corresponding to the first data signal.

5. The display device according to claim 1, wherein the scaling factor varies in accordance with a load of at least a portion of the frame data.

6. The display device according to claim 4, wherein a width of the second sub-frame period varies in accordance with a load of the frame data.

7. The display device according to claim 3, wherein the second data signal is proportional to the first data signal.

8. The display device according to claim 3, wherein a width of the second sub-frame period varies in each frame period.

9. A display device, comprising:

a display panel including a pixel, wherein the pixel includes a light-emitting element and a driving transistor configured to provide a driving current to the light-emitting element in response to a voltage between a gate electrode and a source electrode of the driving transistor, the gate electrode of the driving transistor is electrically coupled to a data line, and the source electrode of the driving transistor is electrically coupled to a readout line; and a data driver configured to provide a data signal to the data line and to provide a reference voltage to the readout line, wherein one frame period includes a first sub-frame period and a second sub-frame period, wherein the data driver is configured to provide a first reference voltage to the readout line during the first sub-frame period, and to provide a second reference voltage to the readout line during the second sub-frame period, wherein the second reference voltage is different from the first reference voltage and varies dependent on the data signal, wherein the data driver is configured to provide an identical data signal to the pixel during each of the first sub-frame period and the second sub-frame period, wherein the second reference voltage varies by stages at least twice during the second sub-frame period.

10. A display device, comprising:

a display panel including a pixel, wherein the pixel includes a light-emitting element and a driving transistor configured to provide a driving current to the light-emitting element in response to a voltage between a gate electrode and a source electrode of the driving transistor, the gate electrode of the driving transistor is electrically coupled to a data line, and the source electrode of the driving transistor is electrically coupled to a readout line, and a data driver configured to provide a data signal to the data line and to provide a reference voltage to the readout line, wherein one frame period includes a first sub-frame period and a second sub-frame period, wherein the data driver is configured to provide a first reference voltage to the readout line during the first sub-frame period, and to provide a second reference voltage to the readout line during the second sub-frame period, wherein the second reference voltage is different from the first reference voltage and varies dependent on the data signal, wherein the data driver is configured to provide an identical data signal to the pixel during each of the first sub-frame period and the second sub-frame period, and wherein the first reference voltage remains constant during the first sub-frame period, wherein the second reference voltage varies by stages at least twice during the second sub-frame period.

11. A display device, comprising:

a display panel including a pixel, wherein the pixel includes a light-emitting element and a driving transistor configured to provide a driving current to the light-emitting element in response to a voltage between a gate electrode and a source electrode of the driving transistor, the gate electrode of the driving transistor is electrically coupled to a data line, and the source electrode of the driving transistor is electrically coupled to a readout line; and a data driver configured to provide a data signal to the data line and to provide a reference voltage to the readout line, wherein one frame period includes a first sub-frame period and a second sub-frame period, wherein the data driver is configured to provide a first reference voltage to the readout line during the first sub-frame period, and to provide a second reference voltage to the readout line during the second sub-frame period, wherein the second reference voltage is different from the first reference voltage and varies dependent on the data signal, wherein the first reference voltage remains constant during the first sub-frame period, and wherein the second reference voltage remains constant during the second sub-frame period.

12. A display device, comprising:

a display panel including a first pixel electrically coupled to a first gate line and a data line and a second pixel electrically coupled to a second gate line and the data line;

a gate driver configured to provide a gate signal to the first and second gate lines; and a data driver configured to provide a data signal to the data line, a timing controller configured to generate frame data based on input image data provided from an external device and to generate attenuated data by downscaling grayscale values included in the frame data, wherein a frame image is displayed during each of a first frame period and a second frame period, and each of the first and second frame periods includes a first sub-frame period and a second sub-frame period, and wherein the gate driver is configured to:

provide the gate signal to each of the first gate line and the second gate line during the first sub-frame period in each of the first and second frame periods, and alternately provide the gate signal to the first gate line and the second gate line during the second sub-frame periods of the first and second frame periods, wherein the data driver is configured to provide a first data signal to the data line during each first sub-frame period, and to provide a second data signal to the data line during each second sub-frame period, wherein the second data signal is different from the first data signal and varies dependent on the first data signal, wherein the data driver is configured to generate the first data signal based on the frame data and to generate the second data signal based on the attenuated data, and wherein the timing controller is configured to calculate a second grayscale value included in the attenuated data by multiplying a scaling factor by a first grayscale value included in the frame data.

13. The display device according to claim 12, wherein the first pixel is configured to emit light with a luminance corresponding to the first data signal during the first sub-frame period of the first frame period, and to emit light with a luminance corresponding to the second data signal during the second sub-frame period of the first frame period.

14. The display device according to claim 12, wherein the second grayscale value corresponding to the second data signal is proportional to the first grayscale value corresponding to the first data signal.

* * * * *